US010952369B2

(12) United States Patent
Araki et al.

(10) Patent No.: US 10,952,369 B2
(45) Date of Patent: Mar. 23, 2021

(54) GRASS MANAGEMENT SYSTEM

(71) Applicant: KUBOTA CORPORATION, Osaka (JP)

(72) Inventors: Hiroyuki Araki, Hyogo (JP); Yasuhisa Uoya, Hyogo (JP); Yoshito Hayakawa, Hyogo (JP); Yuto Kamiya, Hyogo (JP); Ryuji Hashizume, Hyogo (JP)

(73) Assignee: KUBOTA CORPORATION, Osaka (JP)

( * ) Notice: Subject to any disclaimer, the term of this patent is extended or adjusted under 35 U.S.C. 154(b) by 265 days.

(21) Appl. No.: 15/958,590

(22) Filed: Apr. 20, 2018

(65) Prior Publication Data

US 2018/0303031 A1 Oct. 25, 2018

(30) Foreign Application Priority Data

Apr. 24, 2017 (JP) .............................. JP2017-085712
Apr. 24, 2017 (JP) .............................. JP2017-085713
Apr. 24, 2017 (JP) .............................. JP2017-085714

(51) Int. Cl.
*A01D 34/00* (2006.01)
*A01D 43/08* (2006.01)
(Continued)

(52) U.S. Cl.
CPC ......... *A01D 34/008* (2013.01); *A01D 41/127* (2013.01); *A01D 43/04* (2013.01);
(Continued)

(58) Field of Classification Search
CPC .. A01D 34/006; A01D 34/008; A01D 41/127; A01D 43/085; A01D 43/04;
(Continued)

(56) References Cited

U.S. PATENT DOCUMENTS 9,439,348 B2 * 9/2016 Biber ................... A01D 34/008
2003/0023356 A1 * 1/2003 Keable ................. G05D 1/0265
701/23
(Continued)

FOREIGN PATENT DOCUMENTS

EP 3314997 2/2018
EP 3 417 698 A1 12/2018
(Continued)

OTHER PUBLICATIONS

European Search Report issued with respect to Application No. 18000391.5, dated Jul. 11, 2018.
(Continued)

*Primary Examiner* — Alicia Torres
(74) *Attorney, Agent, or Firm* — Greenblum & Bernstein, P.L.C.

(57) ABSTRACT

A grass management system includes a first moisture-obtaining device to obtain a first moisture value of grass in a mowing operation performed by a mower, a position-detecting device to detect a mowing position of the mower, and a creation supporting circuit to support creation of an operation plan for a working machine based on the first moisture value and the mowing position, the working machine being configured to perform an operation relating to the grass already mowed. The grass management system includes a moisture map creating circuit to create a moisture map of an agricultural field based on the first moisture value and the mowing position. The creation supporting circuit is configured to display the moisture map that is created by the moisture map creating circuit in creating the operation plan.

20 Claims, 24 Drawing Sheets

(51) Int. Cl.
*A01D 41/127* (2006.01)
*A01D 43/04* (2006.01)
*A01D 84/00* (2006.01)
*A01F 15/00* (2006.01)

(52) U.S. Cl.
CPC .......... *A01D 43/085* (2013.01); *A01D 84/00* (2013.01); *A01F 15/00* (2013.01)

(58) Field of Classification Search
CPC .......... A01D 84/00; G05D 2201/0208; G05D 1/0088; G05D 1/0044; A01F 15/00
See application file for complete search history.

(56) References Cited

U.S. PATENT DOCUMENTS

| | | | | |
|---|---|---|---|---|
| 2017/0020064 | A1* | 1/2017 | Doughty | G05D 1/0044 |
| 2018/0116121 | A1* | 5/2018 | Murray | A01B 69/008 |
| 2018/0368312 | A1* | 12/2018 | Strang | A01D 34/008 |

FOREIGN PATENT DOCUMENTS

| | | |
|---|---|---|
| JP | 58 164441 | 11/1983 |
| JP | 59 8537 | 1/1984 |
| JP | 2012 175920 A | 9/2012 |
| JP | 2015 99433 A | 5/2015 |
| JP | 2017037681 | 2/2017 |
| JP | 2017 71916 A | 4/2017 |
| WO | 2010/003421 | 1/2010 |
| WO | 2017/058006 A1 | 4/2017 |

OTHER PUBLICATIONS

Wakabayashi et al.: "Smart Agriculture", Japanese Society of Agricultural Informatics (Aug. 29, 2014), p. 163-165.

* cited by examiner

FIG.2
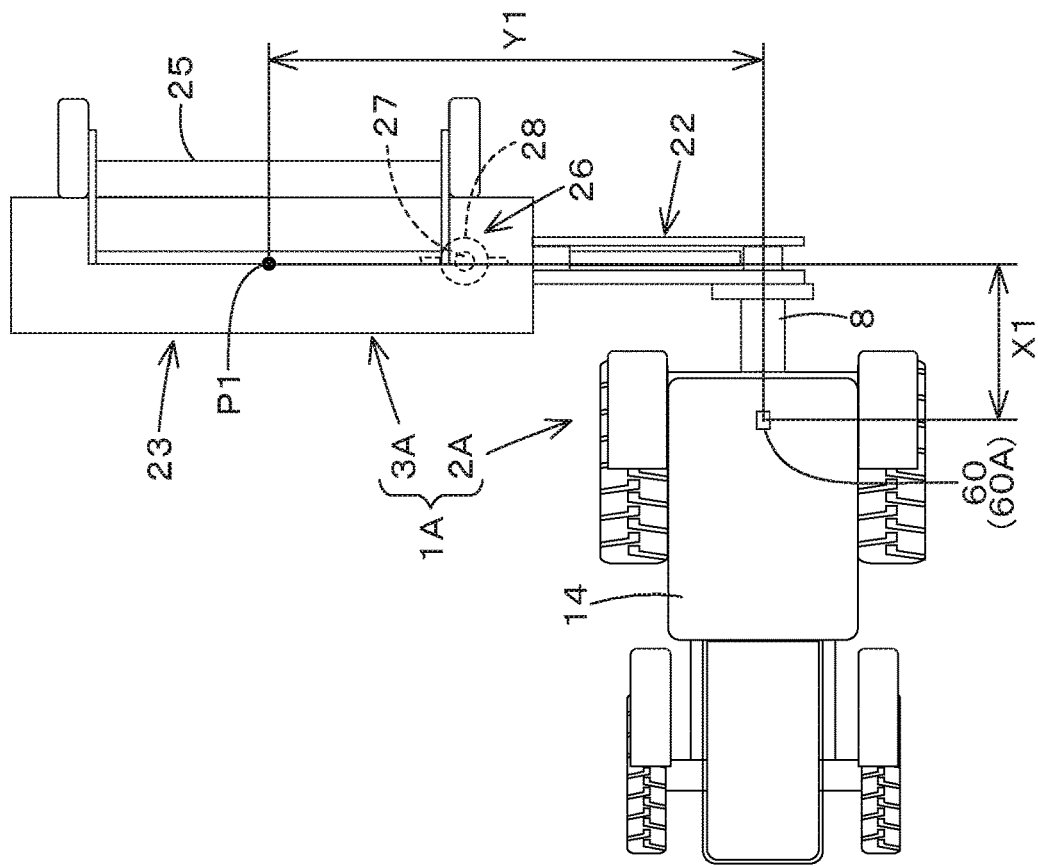
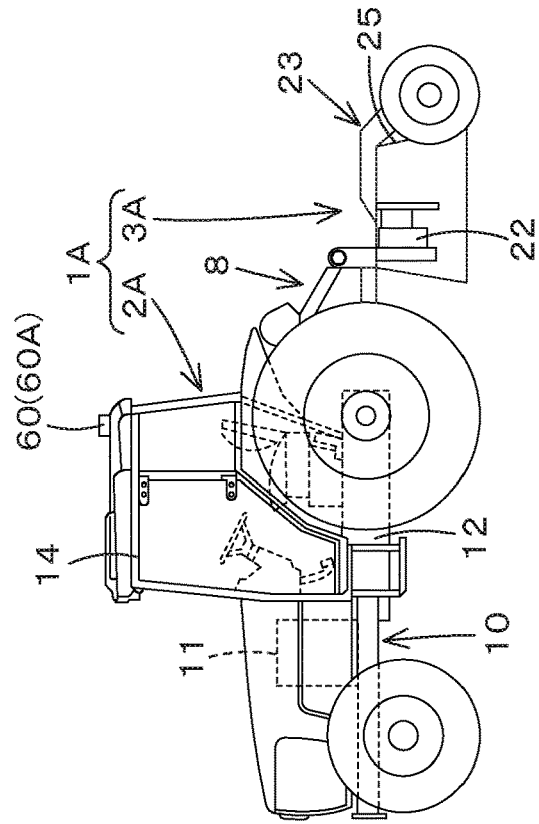

FIG.6

| Mowing position | | First moisture value(%) |
|---|---|---|
| Latitude | Longitude | |
| 34.40.41 | 135.34.19 | 89.5% |
| 34.40.42 | 135.34.19 | 94.0% |
| 34.40.43 | 135.34.19 | 88.6% |
| 34.40.44 | 135.34.19 | 96.7% |
| 34.40.45 | 135.34.19 | 89.2% |
| 34.40.46 | 135.34.19 | 95.2% |
| 34.40.47 | 135.34.19 | 97.6% |
| 34.40.48 | 135.34.19 | 91.0% |
| 34.40.49 | 135.34.19 | 96.6% |
| 34.40.50 | 135.34.19 | 94.8% |
| 34.40.51 | 135.34.19 | 94.6% |
| 34.40.52 | 135.34.19 | 97.1% |
| 34.40.53 | 135.34.19 | 89.0% |
| 34.40.54 | 135.34.19 | 98.0% |
| 34.40.55 | 135.34.19 | 94.1% |
| ⋮ | ⋮ | ⋮ |

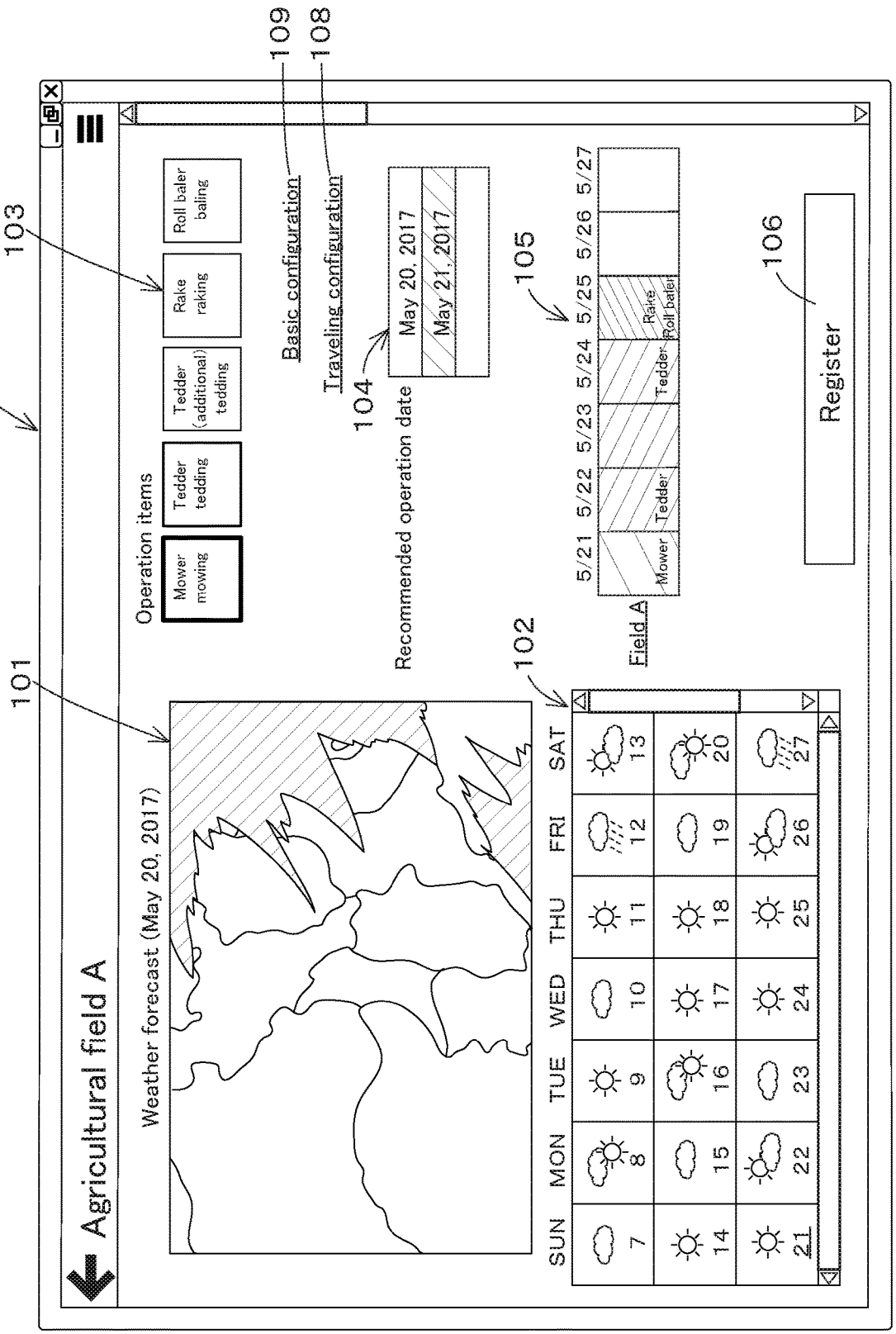

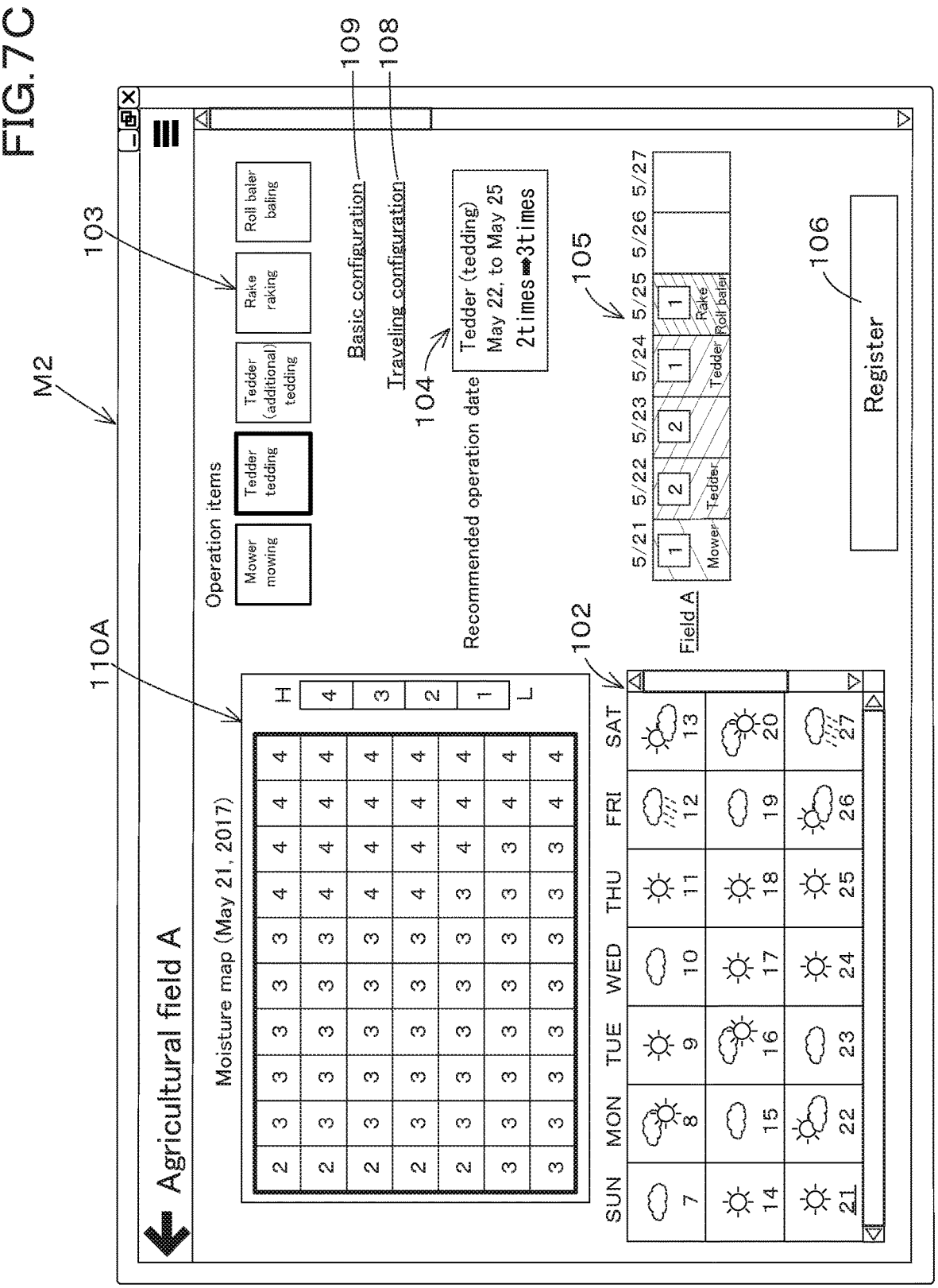

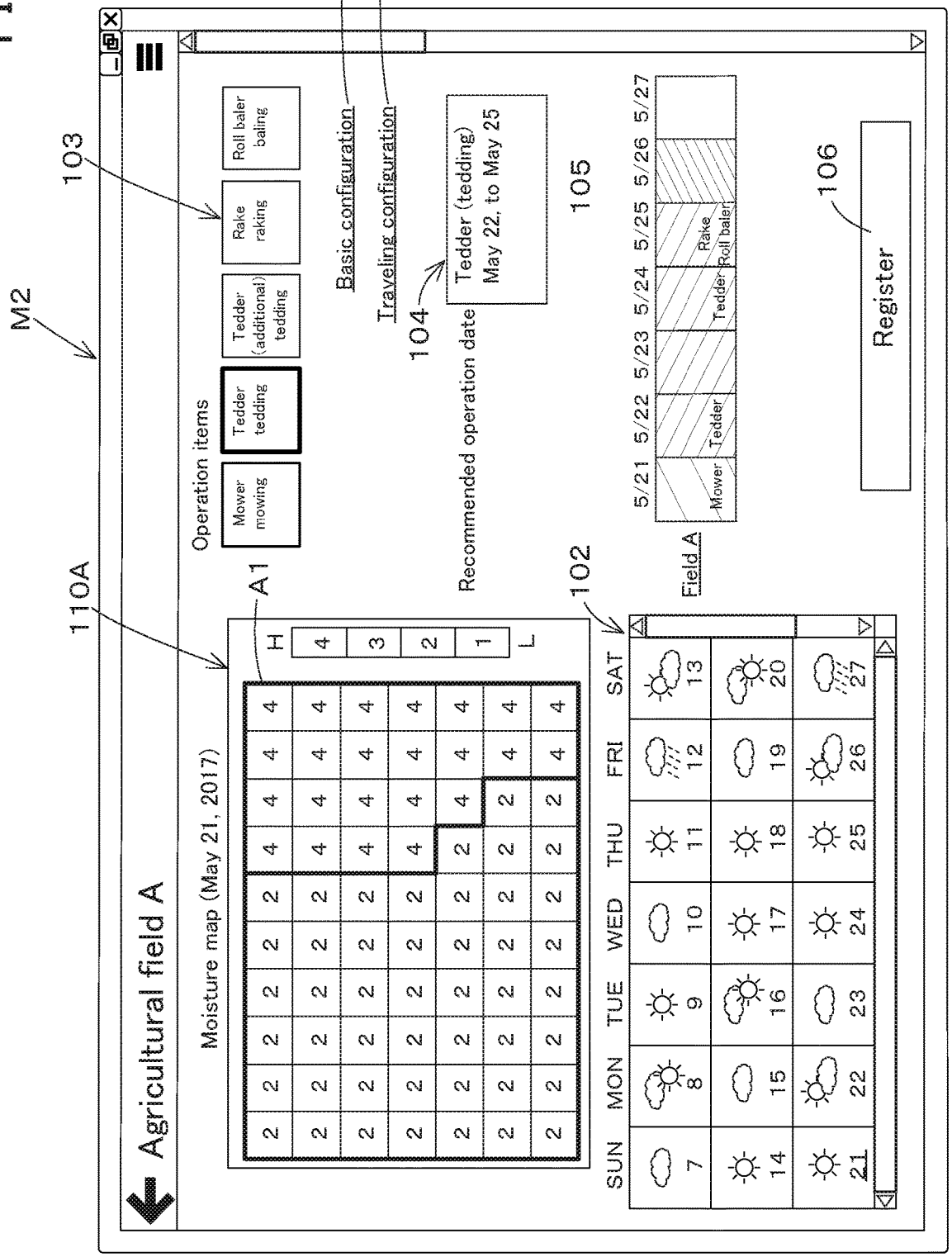

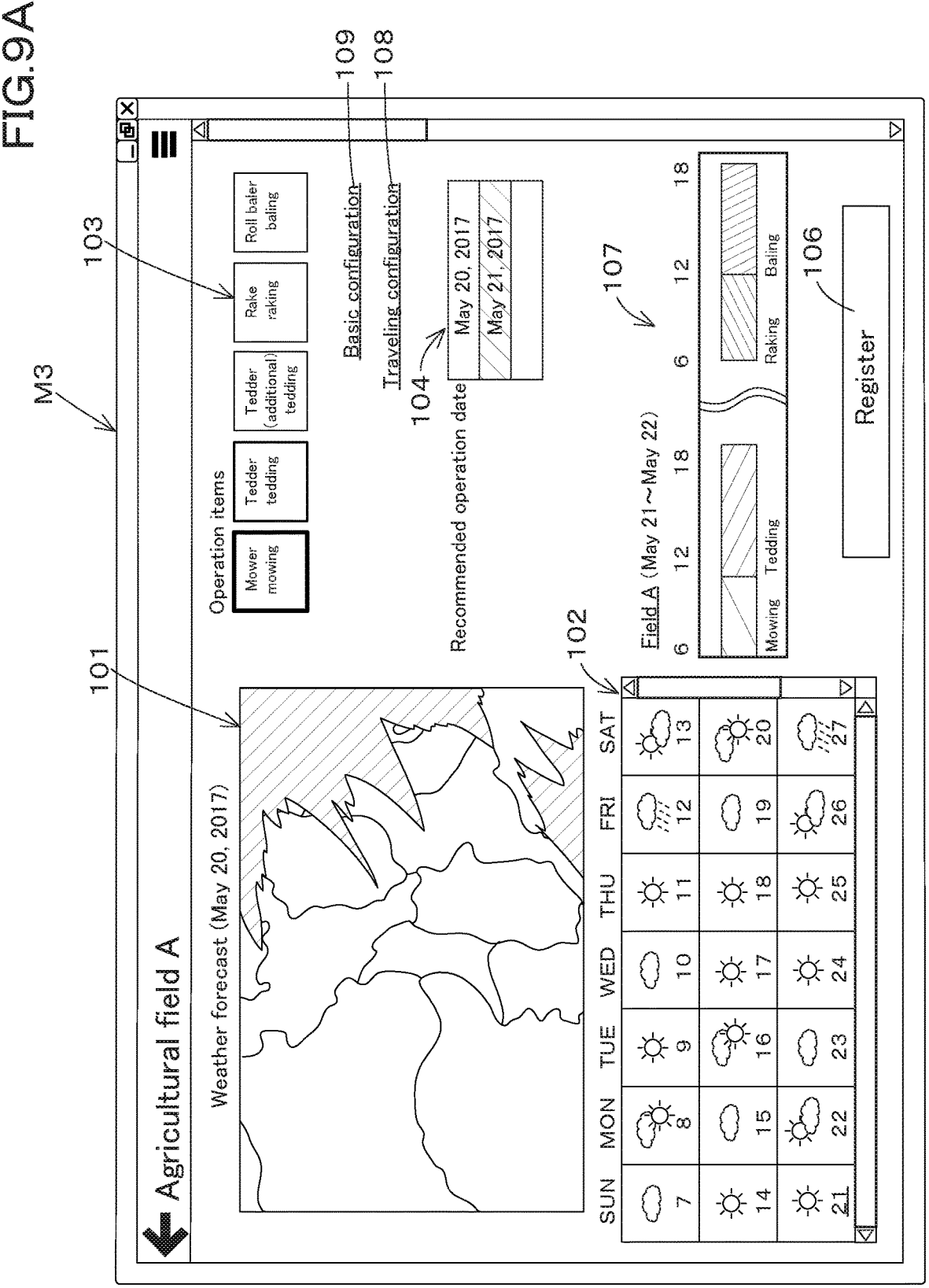

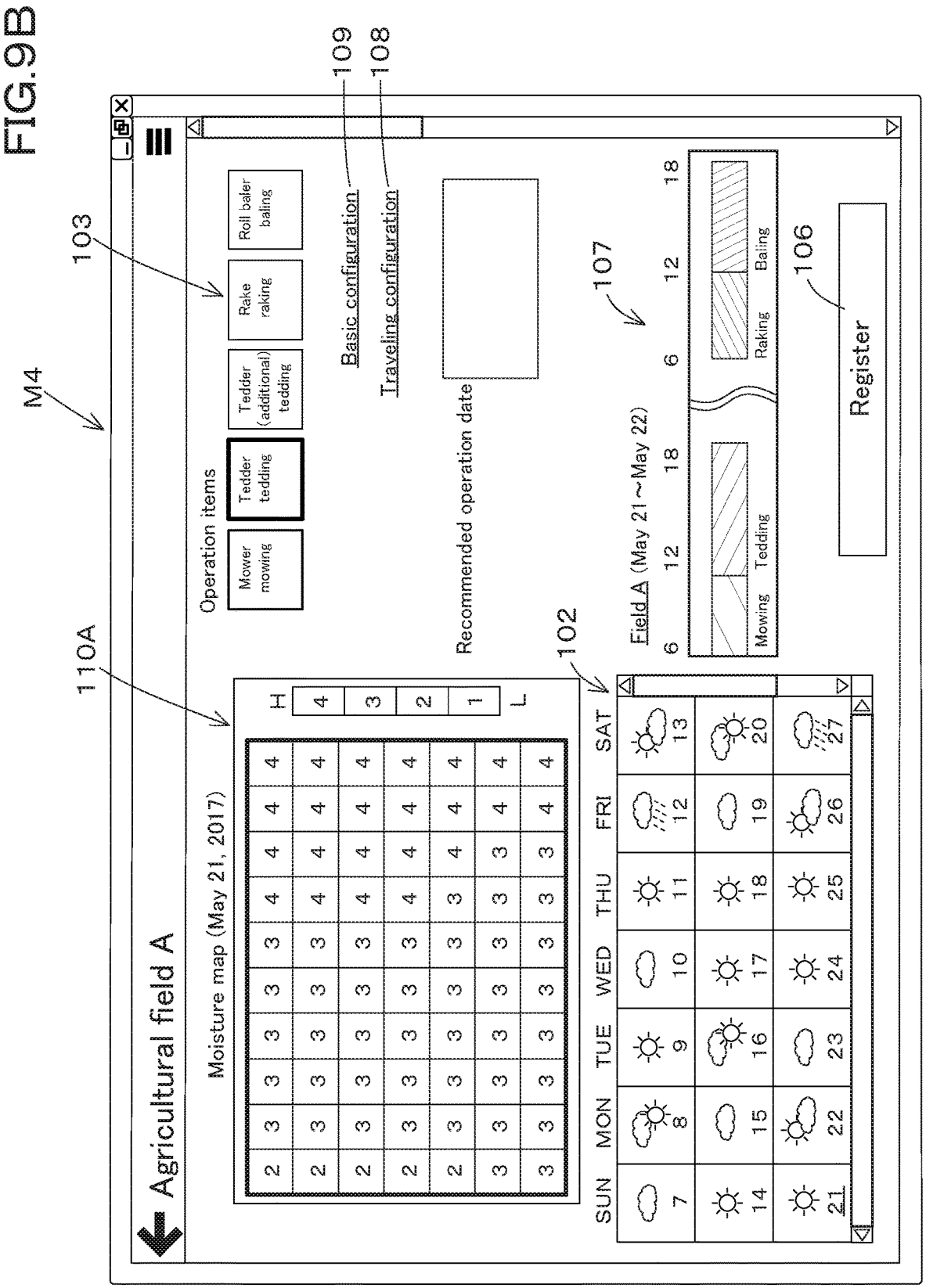

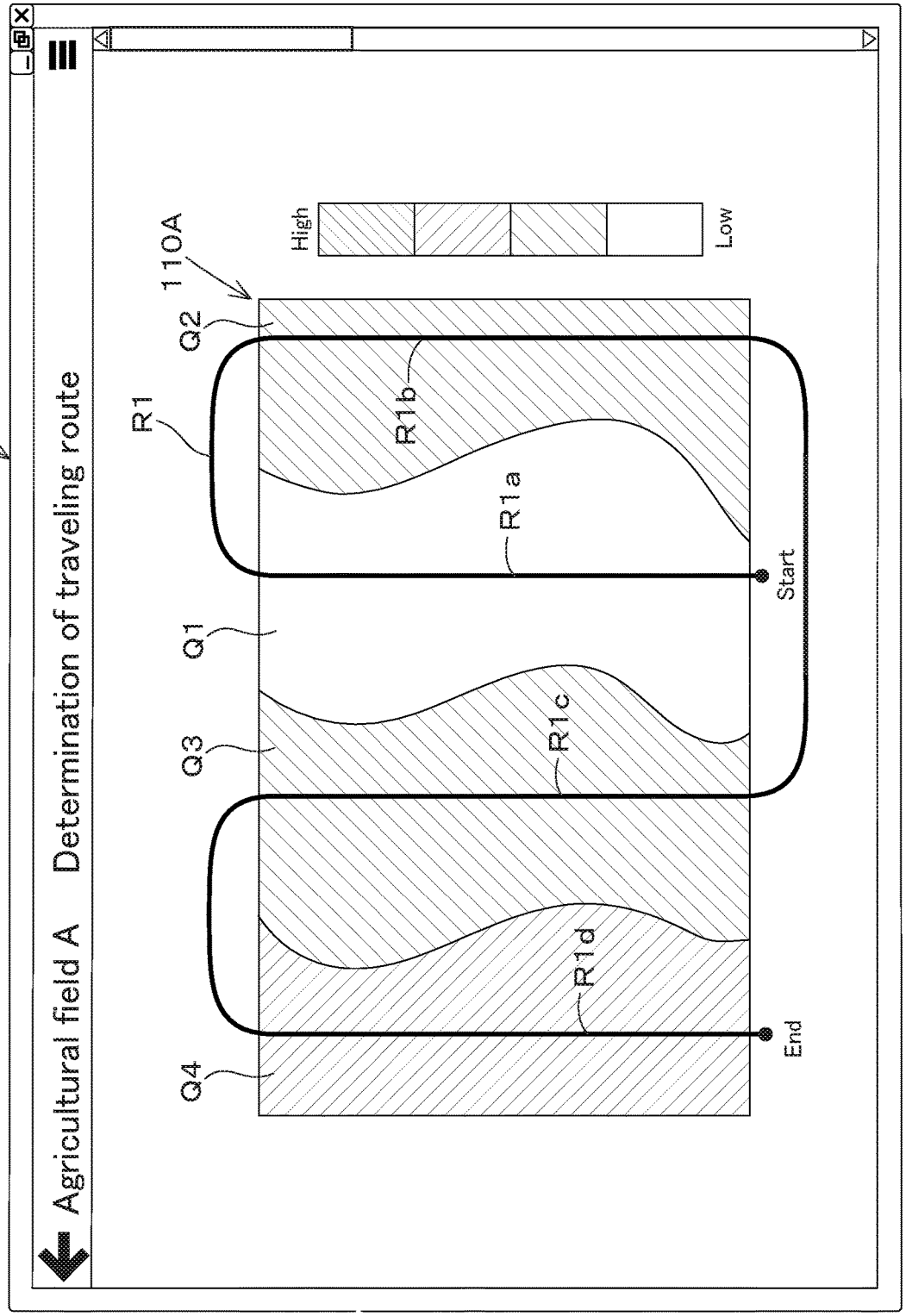

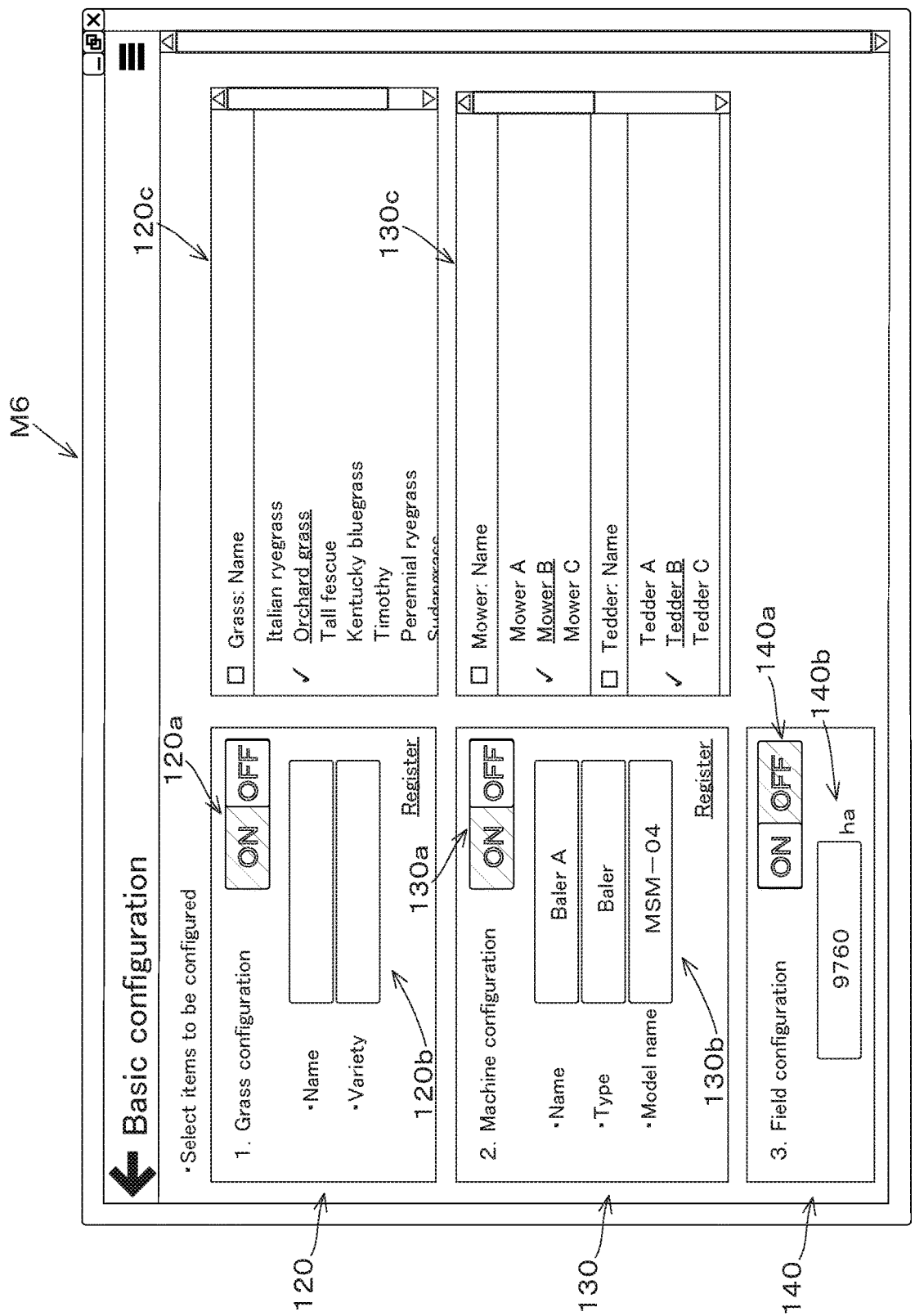

FIG.13

| Mowing position | | Height of Grass |
|---|---|---|
| Latitude | Longitude | Plant height(cm) |
| 34.40.41 | 135.34.19 | 104 |
| 34.40.42 | 135.34.19 | 86 |
| 34.40.43 | 135.34.19 | 100 |
| 34.40.44 | 135.34.19 | 92 |
| 34.40.45 | 135.34.19 | 88 |
| 34.40.46 | 135.34.19 | 95 |
| 34.40.47 | 135.34.19 | 88 |
| 34.40.48 | 135.34.19 | 105 |
| 34.40.49 | 135.34.19 | 93 |
| 34.40.50 | 135.34.19 | 95 |
| 34.40.51 | 135.34.19 | 96 |
| 34.40.52 | 135.34.19 | 94 |
| 34.40.53 | 135.34.19 | 96 |
| 34.40.54 | 135.34.19 | 94 |
| 34.40.55 | 135.34.19 | 91 |
| ⋮ | ⋮ | ⋮ |

FIG.14

| Baling position | | Yield (weight) (kg) |
|---|---|---|
| Latitude | Longitude | |
| 34.40.41 | 135.34.19 | − |
| 34.40.42 | 135.34.19 | − |
| 34.40.43 | 135.34.19 | − |
| 34.40.44 | 135.34.19 | − |
| 34.40.45 | 135.34.19 | − |
| 34.40.46 | 135.34.19 | − |
| 34.40.47 | 135.34.19 | − |
| 34.40.48 | 135.34.19 | − |
| 34.40.49 | 135.34.19 | − |
| 34.40.50 | 135.34.19 | − |
| 34.40.51 | 135.34.19 | − |
| 34.40.52 | 135.34.19 | − |
| 34.40.53 | 135.34.19 | − |
| 34.40.54 | 135.34.19 | − |
| 34.40.55 | 135.34.19 | 517 |
| ⋮ | ⋮ | ⋮ |
| 34.42.55 | 135.34.20 | 510 |
| ⋮ | ⋮ | ⋮ |
| 34.44.55 | 135.34.20 | 523 |

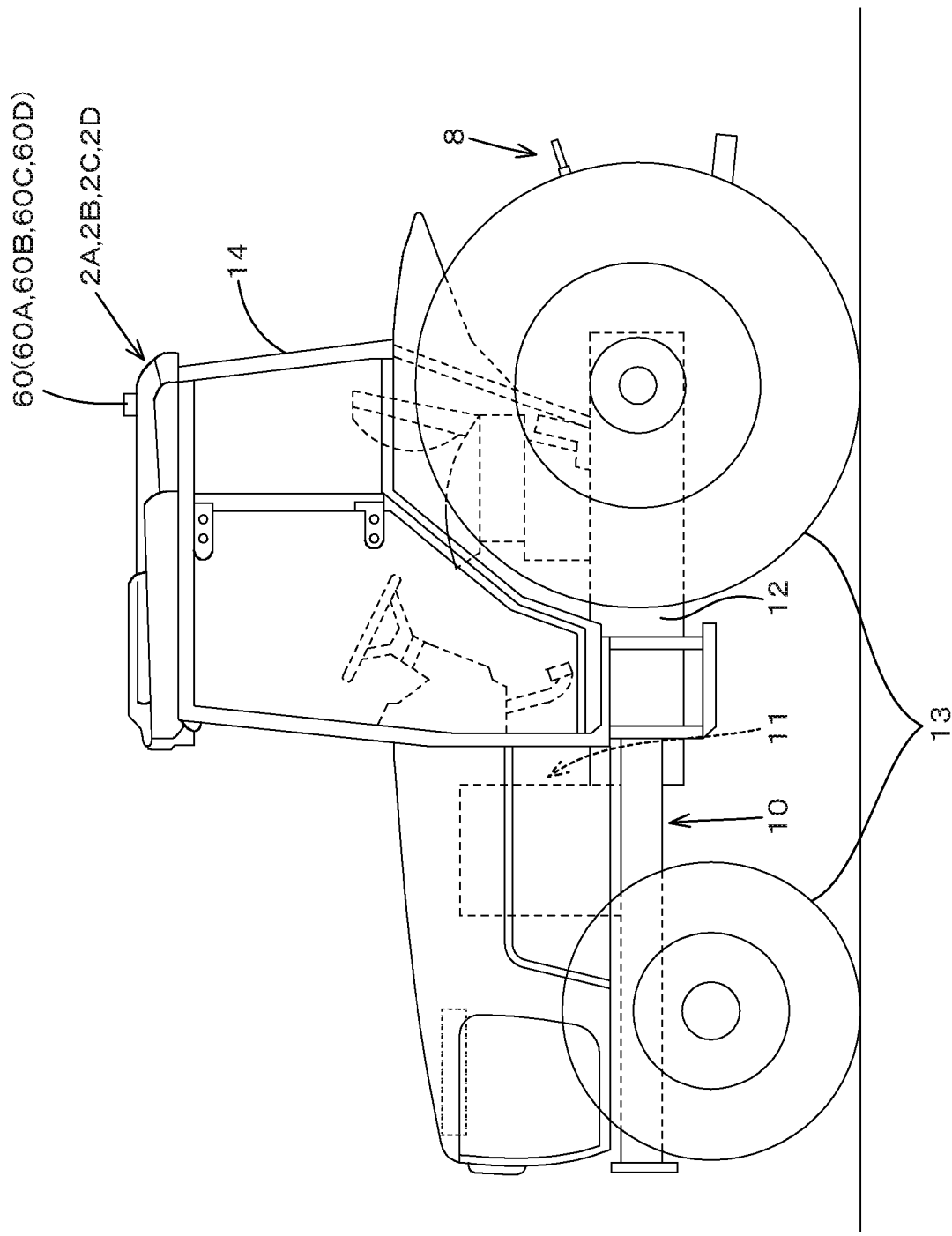

GRASS MANAGEMENT SYSTEM

CROSS-REFERENCE TO RELATED APPLICATIONS

The present application claims priority under 35 U.S.C. § 119 to Japanese Patent Application No. 2017-085712, filed Apr. 24, 2017, to Japanese Patent Application No. 2017-085713, filed Apr. 24, 2017, and to Japanese Patent Application No. 2017-085714, filed Apr. 24, 2017. The contents of these applications are incorporated herein by reference in their entirety.

BACKGROUND OF THE INVENTION

Field of the Invention

The present invention relates to a grass management system.

Discussion of the Background

There is a document represented in Japanese Unexamined Patent Application Publication No. 2017-37681 previously disclosing a system for managing an agricultural operation. An agricultural support system disclosed in Japanese Unexamined Patent Application Publication No. 2017-37681 includes a data collecting device disposed on an agricultural machine for performing an agricultural operation in an agricultural field and configured to collect an agricultural operation data generated when the agricultural machinery performs the agricultural operation, a server configured to store the agricultural data, and a mobile terminal configured to communicate with the server. The mobile terminal includes a creation means configured to create operation contents including at least the agricultural field and the agricultural machine for performing the agricultural operation in the agricultural field, and a communication part configured to send the operation content created by the creation means.

SUMMARY OF THE INVENTION

A grass management system includes a first moisture-obtaining device configured to obtain a first moisture value of grass in a mowing operation performed by a mower, a position-detecting device configured to detect a mowing position of the mower, and a creation supporting part configured to support creation of an operation plan for a working machine based on the first moisture value and the mowing position, the working machine being configured to perform an operation relating to the grass already mowed.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a view illustrating a side view and plan view of a whole of a mower according to the embodiment;

FIG. 6 is a view illustrating a relation between a mowing position and a first moisture value according to the embodiment;

FIG. 7A is a view illustrating a creation screen M1 according to the embodiment;

FIG. 7C is a view illustrating a modified example of a date scheduling portion in the creation screen according to the embodiment;

FIG. 8 is a view illustrating unevenness of the first moisture value in a predetermined area A1 in an mowing operation according to the embodiment;

FIG. 9A is a view illustrating a creation screen M3 according to the embodiment;

FIG. 9B is a view illustrating a creation screen M4 according to the embodiment;

FIG. 10 is a view illustrating a creation screen M5 according to the embodiment;

FIG. 11 is a view illustrating a creation screen M1 according to the embodiment;

FIG. 13 is a view illustrating a relation between the mowing position and a grass height according to the embodiment;

FIG. 14 is a view illustrating a relation between a baling position and a yield (a weight) according to the embodiment;

FIG. 21 is a view illustrating a whole of the tractor according to the embodiment.

DESCRIPTION OF THE EMBODIMENTS

Figure 1:
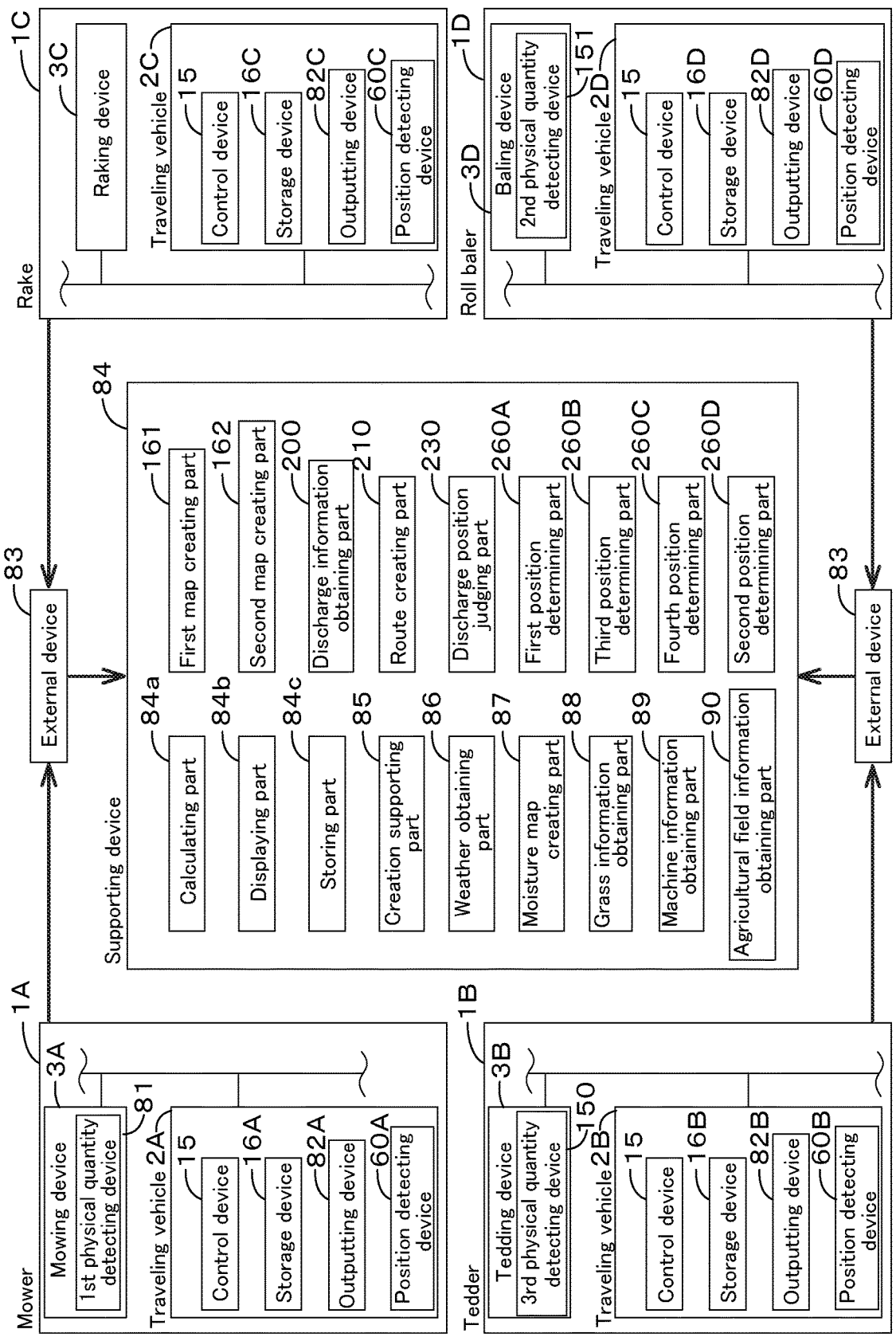
FIG. 1 is a view illustrating a grass management system according to an embodiment of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, embodiments of the present invention will be described with reference to the drawings.

FIG. 1 shows an overall view of a grass management system. The grass management system is a system configured to manage items relating to grasses (grass pastures) planted in an agricultural field.

The grass growing in the agricultural field is treated by at least one working machine. As shown in FIG. 1, the working machine is a mower (a mower) 1A configured to cut the grass. In addition, the working machine also is a tedder (a diffuser) 1B configured to ted (spread) the grass. In addition, the working machine also is a rake (a grass collecting machine) 1C configured to collect the grass. In addition, the working machine also is a roll baler (a roll baler) 1D configured to roll (mold) the grass.

The mower 1A includes a traveling vehicle 2A and a mowing device (a mowing device) 3A connected to the traveling vehicle 2A. The tedder 1B includes a traveling vehicle 2B and a tedding device (a tedding device) 3B connected to the traveling vehicle 2B. The rake 1C includes a traveling vehicle 2C and a raking device (a raking device) 3C connected to the traveling vehicle 2C. The roll baler 1D includes a traveling vehicle 2D and a baling device (a molding device) 3D connected to the traveling vehicle 2.

Each of the traveling vehicles 2A, 2B, 2C and 2D is a tractor configured to travel. Firstly, the tractors (the traveling vehicles) 2A, 2B, 2C, and 2D will be described below.

As shown in FIG. 21, each of the tractors 2A, 2B, 2C and 2D includes a vehicle body 10, a prime mover 11, and a speed-changing device (a transmission) 12. The vehicle body 10 is provided with a traveling device 13. The traveling device 13 is a device having a front wheel and a rear wheel. The traveling device 13 may be constituted of a crawler type device.

The prime mover 11 is constituted of a diesel engine, an electric motor, or the like, and in the embodiment, the prime mover 11 is constituted of the diesel engine. The transmission 12 is configured to switch a thrust force of the traveling device 13, and is also configured to switch the traveling device 13 between forward driving and reverse driving.

Further, a connecting portion 8 constituted of a three-point link mechanism or the like is arranged on a rear portion of the vehicle body 10. The working devices (the mowing device 3A, the tedding device 3B, the raking device 3C, the baling device 3D) are configured to be attached to and detached from the connecting portion 8. By connecting the working device to the connecting portion 8, the working device can be towed by the vehicle body 10.

In addition, each of the tractors 2A, 2B, 2C, and 2D has a PTO shaft configured to be driven by a motive power of the prime mover 11 or the like, and the motive power of the PTO shaft can be transmitted to the working device. In addition, each of the tractors 2A, 2B, 2C and 2D is provided with a cabin 14 having an operator seat therein.

As shown in FIG. 1, each of the tractors 2A, 2B, 2C, and 2D includes a control device 15. The control device 15 is configured to control a traveling system and a working system of each of the tractors 2A, 2B, 2C, and 2D on the basis of operation signals outputted when an operation tool (an operation lever, an operation switch, an operation volume, and the like) installed around the operator seat, a detection signal of various sensors mounted on the vehicle body 10, and the like.

For example, the control device 15 is configured to control the working device to be raised and be descended on the basis of the operation (the operation signal) of the operation tool, and controls a revolution speed of the diesel engine on the basis of the accelerator pedal sensor. It is sufficient that the control device 15 controls the working systems and the traveling systems of the tractors 2A, 2B, 2C, and 2D, and the control method is not limited to that.

As shown in FIG. 2, the mowing device 3A includes a connecting frame 22 connected to the connecting portion 8 of the tractor 2A and includes a mowing portion 23 connected to the connecting frame 22. The mowing portion 23 includes an intake portion 25 configured to take the grass to be cut and includes a plurality of mowing portions 26 configured to cut the grass pasture taken in from the intake portion 25. Of the plurality of mowing portions 26 included in the mowing device 3A, one of the mowing portions 26 is shown in FIG. 2.

The mowing portion 26 includes a plurality of rotation shafts 27 and includes a plurality of cutters 28 attached to the rotation shafts 27. The motive power of the PTO shaft is transmitted to the rotation shafts 27 through the driving shaft 28 supported by the connecting frame 22, and each of the rotation shafts 27 rotates. Each of the cutters 28 is constituted of a disk-shaped cutter, and the cutters 28 adjacent to each other rotate in synchronization with the rotation of the rotary shaft 27, and thereby cut the grass.

That is, the cutters 28 are rotated by the rotary shafts 27, the grass is cut by the cutters 28, and the grass is discharged to the outside after being cut. It should be noted that the mowing device 3A is not limited to the above-described configuration, and may be any devices configured to mow (cut) the grass pasture. For example, the mowing device 3A may be a hammer knife type in which the grass is cut by the knife-shaped cutters 28 or may be another type.

Figure 3:
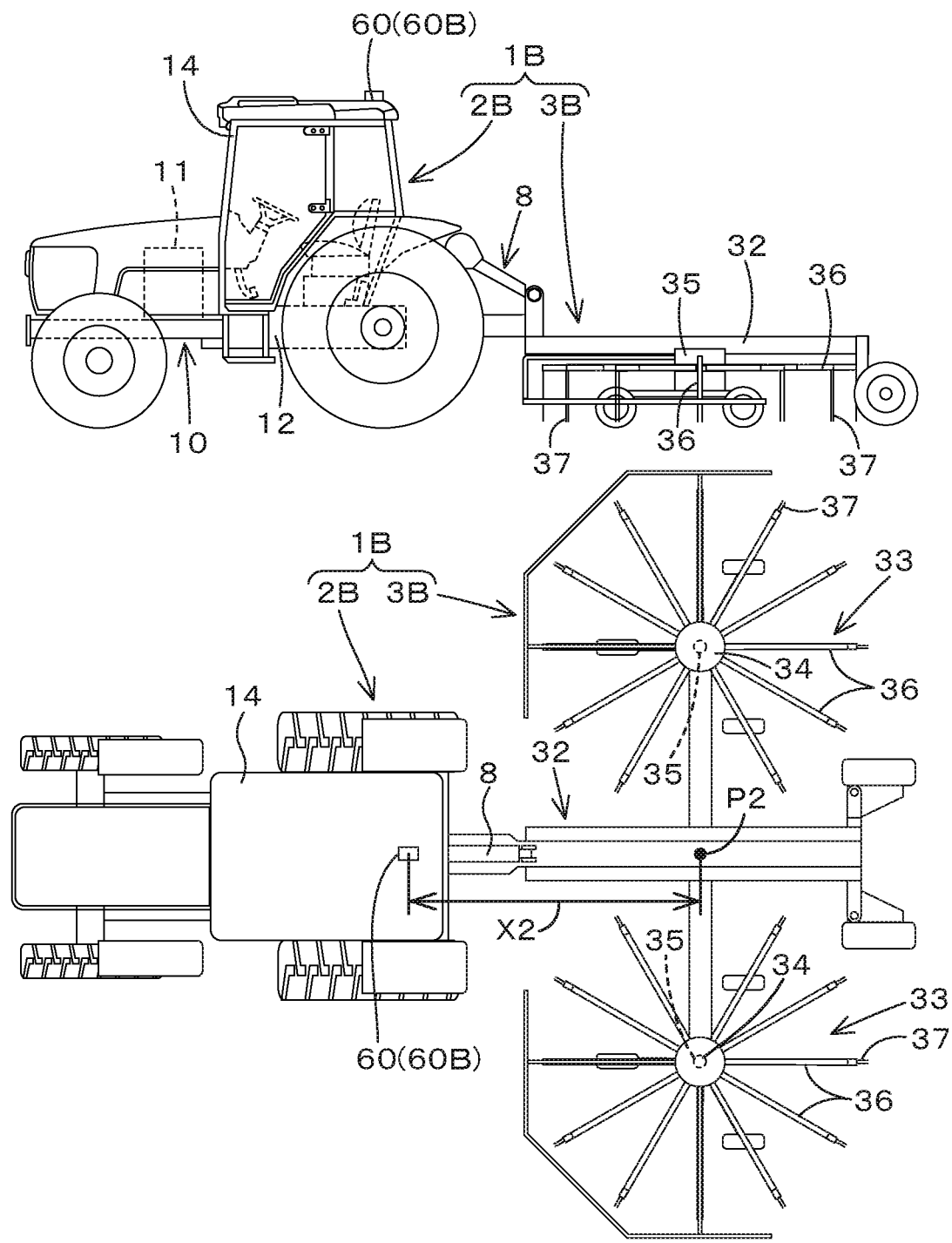
FIG. 3 is a view illustrating a side view and plan view of a whole of a tedder according to the embodiment.

As shown in FIG. 3, the tedding device 3B includes a connecting frame 32 connected to the connecting portion 8 of the tractor 2B and includes a tedding portion 33 connected to the connecting frame 32. Meanwhile, FIG. 3 shows an example in which two tedding portions 33 are connected to the connecting frame 32.

The tedding portion 33 includes a main body 34 connected to the connecting frame 32, a rotation shaft 35 rotatably supported by the main body 34, a plurality of arms (tine arms) 36 connected to the rotation shaft 35, a plurality of arms 36, and a tedding tool (a tine) 37 connected to each of the arms 36. The tine 37 is, for example, constituted of a member whose tip is divided into two branches.

The motive power of the PTO shaft is transmitted to the rotation shaft 35 through the driving shaft supported by the connecting frame 32, and thereby the rotation shaft 35 rotates. As the rotation shaft 35 rotates, the arm 36 rotates, and thus the grass is diffused by the tedding tool 37. That is, the rotation of the rotation shaft 35 causes the tedding tool 37 to rotate, and thereby the grass is diffused by the tedding tool 37. Note that the tedding device 3B is not limited to the above-described configuration, and may be constituted of any device configured to diffuse the grass.

For example, one or more than three tedding portions 33 may be provided. In addition, the tedding portion 33 may be a rotary type in which the rotor having the tedding tool 37 rotates about its longitudinal axis, may be a belt/chain type in which a plurality of tedding tools 37 are attached to a rotating belt or a rotating chain, or may be another type.

Figure 4:
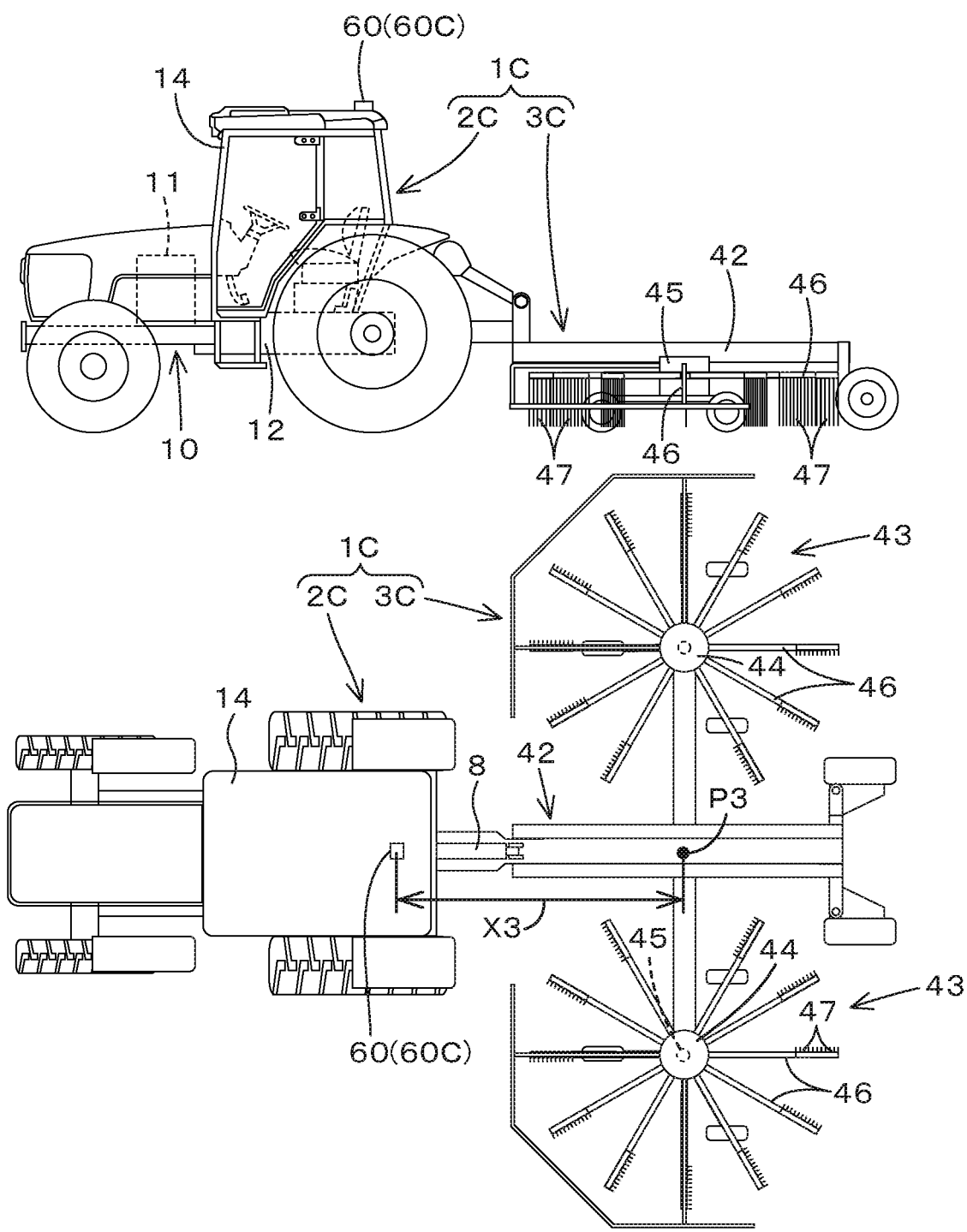
FIG. 4 is a view illustrating a side view and plan view of a whole of a rake according to the embodiment.

As shown in FIG. 4, the raking device 3C includes a connecting frame 42 connected to the connecting portion 8 of the tractor 2C and includes a raking portion 43 connected to the connecting frame 42. Meanwhile, FIG. 4 shows an example in which two raking portions 43 are connected to the connecting frame 42.

The raking portion 43 includes a main body 44 connected to the connection frame 42, a rotation shaft 45 rotatably supported by the main body 44, a plurality of arms (tine arms) 46 connected to the rotation shaft 45, and a raking tool (a tine) 47 connected to each of the plurality of arms 46. Meanwhile, a clearance between the raking tools 47 in the raking device 3C is shorter than a clearance between the tedding tools 37 in the tedding device 3B.

The tines 47 is, for example, constituted of members whose distal ends are divided into two branches. The motive power of the PTO shaft is transmitted to the rotation shaft 45 through the driving shaft supported by the connecting frame 42, and then the rotation shaft 45 is rotated. As the rotary shaft 45 rotates, the arm 46 rotates, and thereby the grass is collected by the raking tool 47. That is, the raking tool 47 is rotated by the rotation of the rotation shaft 45, and the grass pasture is gathered by the raking tool 47.

Meanwhile, note that the configuration of the raking device 3C is not limited to the configuration described above, and may be any device configured to collect the grass pasture. For example, one or more than three raking portions 43 may be provided. In addition, the raking portion 43 may be a rotary type in which the rotor having the raking tool 47 rotates about the longitudinal axis thereof, ma be a belt/chain type in which the plurality of raking tools 47 are attached to a rotating belt or a rotating chain, or may be another type.

Figure 5:
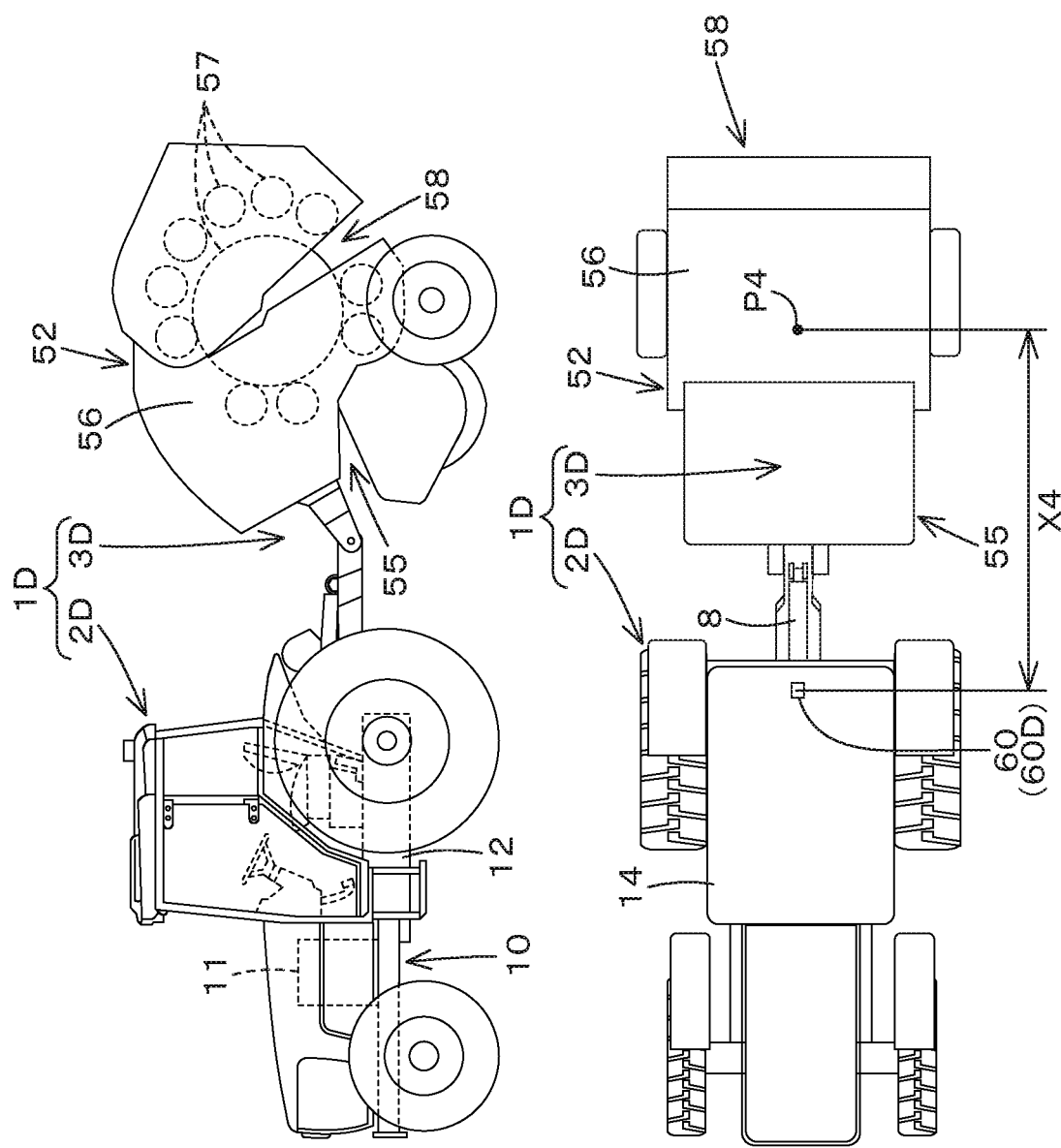
FIG. 5 is a view illustrating a side view and plan view of a whole of a roll baler according to the embodiment.

As shown in FIG. 5, the baling device 3D is constituted of a device configured to form the pasture grass gathered by collecting the grass into a predetermined shape, and is, for example, constituted of a device configured to form the grass in a columnar shape or form the grass in a rectangular parallelepiped shape. In the embodiment, the baling device 3D will be described taking a roll baler configured to form the grass in a cylindrical shape (a roll) as an example. The baling device 3D includes a main body 52 and includes a traveling device disposed on the main body 52. The traveling device is constituted of a wheeled traveling device having wheels.

The main body 52 includes an intake part 55 configured to take in the grass pasture to be rolled, a storing part 56 configured to store the grass pasture taken in by the intake part 55, a baling part 57 configured to form the grass to a baled material rolled by a rotating roller or the like, the grass being taken into the storing part 56, and a discharging part 58 configured to discharge the baled material rolled by the baling part 57.

Thus, the grass is formed into a roll-shaped baled material of a predetermined size by the baling device 3D, and is discharged to the outside after being formed. The baling device 3D may be a chain type in which the grass is formed to have a roll shape by a chain, a belt type in which the grass is formed to have the roll shape by a belt, or another type.

Then, as shown in FIG. 1 and FIG. 21, the grass management system includes at least one position detecting device 60 configured to detect a position of the working machine. The position detecting device 60 includes a position detecting device 60A configured to detect a position of the mower 1A. The position detecting device 60 includes a position detecting device 60B configured to detect a position of the tedder 1B. The position detecting device 60 includes a position detecting device 60C configured to detect a position of the rake 1C. The position detecting device 60 includes a position detecting device 60D configured to detect a position of the roll baler 1D.

The position detecting devices 60A, 60B, 60C and 60D will be described below. The position detecting device 60A is attached to a top plate of the cabin 14 of the tractor 2A. The position detecting device 60B is attached to a top plate of the cabin 14 of the tractor 2B. The position detecting device 60C is attached to a top plate of the cabin 14 of the tractor 2C. The position detecting device 60D is attached to a top plate of the cabin 14 of the tractor 2D.

That is, in the embodiment, each of the position detecting devices 60A, 60B, 60C, and 60D is attached to a tractor that is a traveling vehicle. Although the position detecting devices 60A, 60B, 60C, and 60D are attached to the top plate of the cabin 14, the attaching location in the tractor (the traveling vehicle) is not limited to that, and may be another location.

The position detecting devices 60 A, 60 B, 60 C, and 60 D detect their own positions (the positioning information including the latitude and the longitude) with use of the satellite positioning system. That is, the position detecting devices 60A, 60B, 60C, and 60D are configured to receive the signals (the position of positioning satellite, the transmission time, the correction information, and the like) transmitted from the positioning satellite, and configured to detect the position (for example, the latitude, the longitude) on the basis of the received signal. The position detecting devices 60A, 60B, 60C, and 60D may detect not only the positions such as the latitude and the longitude but also information in the vertical direction (in the height direction), that is, the height information.

When the mower 1A, the tedder 1B, the rake 1C, and the roll baler 1D are provided with the position detecting devices 60A, 60B, 60C, and 60D as described above, a position of the mowing operation, a position of the tedding operation, a position of the raking operation. and a position of the baling operation can be individually detected.

The position of the mowing operation is stored in a storage device (a first storage device) 16A disposed on the tractor 2 A. The position of the tedding operation is stored in a storage device 16B disposed on the tractor 2B. The position of the raking operation is stored in a storage device 16C disposed on the tractor 2C. The position of the baling operation is stored in a storage device (a second storage device) 16D disposed on the tractor 2D.

As shown in FIG. 1, the grass management system includes a first physical quantity detecting device 81. The first physical quantity detecting device 81 is a device configured to detect a physical quantity relating to the grass, for example, a component (a moisture quantity, protein) and the like included in the grass. The first physical quantity detecting device 81 is disposed on the mower 1A. The first physical quantity detecting device 81 obtains at least a moisture value (referred to as a first moisture value) of the grass in the mowing operation operated by the mower 1A.

For convenience of the explanation, when the first physical quantity detecting device 81 is a device configured to obtain the first moisture value of the grass in the mowing operation performed by the mower 1A, the first physical quantity detecting device 81 is referred to as "a first moisture obtaining device".

The first moisture obtaining device 81 is disposed on the mowing portion 23, and obtains the first moisture value of the grass in the mowing of the grass pasture with used of the mowing portion 23. For example, the first moisture obtaining device 81 is a spectroscopic analyzer, that is, a spectroscopic analyzer configured to irradiate a light source having a predetermined frequency to the grass, to receive a reflection light from the grass, and then to analyze the moisture of the grass. The first moisture obtaining device 81 is connected to the control device 15 or the storage device 16A disposed on the tractor 2A. The first moisture obtaining device 81 is configured to transmit the obtained first moisture value to the control device 15 or the storage device 16A.

For example, when the control device 15 or the first moisture obtaining device 81 detects the start of traveling of the tractor 2A, the start of power transmission from the PTO shaft to the mowing device 3A, and the start of driving of the mowing portion 23, the first moisture obtaining device 81 starts obtaining the first moisture value. In addition, when the control device 15 or the first moisture obtaining device 81 detects the end of traveling of the tractor 2A, the end of power transmission from the PTO shaft to the mowing device 3A, and the end of driving of the mowing portion 23, the first moisture obtaining device 81 ends the obtaining of the first moisture value.

Meanwhile, It should be noted that the start of and the end of obtaining of the first moisture value performed by the first moisture obtaining device 81 are not limited to the examples mentioned above. For example, when the control device disposed around the operator seat of the tractor 2A is operated, or when the start or the end of the mowing operation is ordered by a display device, a switch or the like disposed around the operator seat. Alternatively, a switch or the like configured to order the first moisture obtaining device 81 to start and end the obtaining of the first moisture value may be disposed around the operator seat.

In addition, when the obtaining of the first moisture value is performed in the mower 1A, the position detecting device 60A detects at least the position (the latitude and the longitude), and the storage device 16A stores the detected position (the mowing position) and the first moisture value as shown in FIG. 6.

As shown in FIG. 1, the tractor 2A includes an outputting device 82A. The outputting device 82A is a device that is connected to at least the storage device 16A and configured to output the mowing position and the first moisture value stored in the storage device 16A to an external device 83. The external device 83 is constituted of an electronic storage medium such as a USB memory, an SD card, or the like. The outputting device 82A has a connecting portion that is connected to the external device 83, and when the external device 83 is connected, the outputting device 82A outputs the mowing position and the first moisture value to the external device 83.

As shown in FIG. 1, the grass management system includes a supporting device 84. The supporting device 84 is, for example, constituted of a personal computer owned by an administrator or the like. Meanwhile, it should be noted that the supporting device 84 may be constituted of a mobile terminal such as a smartphone, a tablet, a PDA, or the like, and may be constituted of a server or the like.

The supporting device 84 includes a calculating part 84a constituted of a CPU or the like, a displaying part (a display device) 84b, and a storing part 84c constituted of a non-volatile memory or the like. In addition, the supporting device 84 has a connecting portion configured to be connected to the external device 83. The displaying part (the display device) 84b is a device configured to display various information and constituted of a liquid crystal panel or the like.

Then, the grass management system is provided with a creation supporting part 85. The creation supporting part 85 is constituted of electric/electronic parts disposed on the supporting device 84, programs incorporated in the calculating part 84a (the supporting device 84), and the like. The creation supporting part 85 supports creation of an operation plan for the working machine.

For example, the creation supporting part 85 supports creation of at least one of the operation plan of the mowing operation of the mower 1A, the operation plan of the tedding operation of the tedder 1B, the operation plan of the raking operation of the rake 1C, and the operation plan of the baling operation of the roll baler 1D.

As shown in FIG. 7A, when an administrator or the like operates the supporting device 84, the creation supporting part 85 displays a creation screen M1 for creating an operation plan on the displaying part 84b. The creation screen M1 is a screen for setting an operation plan in a predetermined agricultural field, that is, a predetermined section. In FIG. 7A, the creation screen M1 for setting an operation plan for the agricultural field A is shown.

In addition, an agricultural field owned by an administrator or the like is registered in advance in the supporting device 84, and it is possible to set (determine) an operation plan for each of the agricultural fields when a plurality of agricultural fields are registered in the supporting device 84. For convenience of the explanation, the explanation will be made assuming that an operation plan for one agricultural field (an agricultural field A) is set up.

The creation supporting part 85 orders the supporting device 84 to obtain weather information in a predetermined area including the agricultural field A. The weather information is obtained by the weather obtaining part 86 disposed on the supporting device 84. The weather obtaining part 86 is constituted of electric/electronic parts disposed on the supporting device 84, programs incorporated in the calculating part 84a (the supporting device 84), and the like.

In response to the instruction of the creation supporting part 85, the weather obtaining part 86 connects the supporting device 84 to a server or the like of the Meteorological Agency through an external network (a WAN or the like), and then obtains the weather information provided by the Meteorological Agency. Alternatively, the weather obtaining part 86 connects the supporting device 84 to a server such as a weather information providing company that provides the weather information, and thus obtains the weather information.

Meanwhile, the method of obtaining the weather information is not limited. The weather information is information indicating a wind direction, a wind speed, a temperature, a humidity, sunny, cloudy, rainy, lightning, snow, a rainfall amount, a snowfall amount, a precipitation probability, an atmospheric pressure, an atmospheric pressure arrangement, and the like in a predetermined area and at a predetermined time.

When the supporting device 84 obtains the weather information, the creation supporting part 85 displays the weather information on the creation screen M1. The creation supporting part 85 displays, on the creation screen M1, the weather information on the area preliminarily set in the supporting device 84 before the operation plan is created. For example, the creation supporting part 85 displays, on a creation screen M1, a weather map 101 showing the weather shift on a map and displays a weekly weather forecast 102 that indicates a weather forecast for a predetermined period (for example, for every week) corresponding to the date.

The creation supporting part 85 displays, on the creation screen M1, an operation item part 103 that displays operation items relating to an operation for the grass pasture [the mowing operation (the mower), the tedding operation (the tedder), the raking operation (the rake), and the baling operation (the roll baler)]. In addition, the operation items indicated in the operation item part 103 can be selected. Since the operation item in FIG. 7A is the mowing operation, it can be seen that the creation screen M1 is a screen provided for setting the operation plan starting from the mowing operation.

The creation supporting part 85 supports the operation plan on the basis of the weather information. In particular, the creation supporting part 85 displays, on the creation screen M1, a recommendation displaying part 104 configured to display a recommended date where the operations (the mowing operation, the tedding operation, the raking operation, and the baling operation) are recommended. For example, in the case of an operation plan for the mowing operation, the creation supporting part 85 calculates a recommended date on the basis of the weather information in consideration of the number of days (an operation period) from the mowing operation to the baling operation, and then displays the calculated recommended date on the recommendation displaying part 104.

For example, when the operation period is about one week, it is preferable that it will be continuously sunny for about one week (during the operation period) from the start of the mowing operation to the baling operation, and thus the days on which sunny weather is predicted consecutively or the days on which the low precipitation probability is expected to be continuous is employed as the recommended date.

Meanwhile, the recommended date determined by the creation supporting part 85 is not limited to the example described above, but a recommended date may be determined in consideration of the wind direction, the wind speed, the temperature, the humidity, and the like, or a recommended date may be determined by another method. The recommended date displayed on the recommendation displaying part 104 can be selected, and a date "May 21, 2017" is selected for the mowing operation in FIG. 7A.

The creation supporting part 85 displays the scheduled date part 105 configured to display the date for performing each operation corresponding to the operation item. The creation supporting part 85 assigns the operation items (the operations) to dates on the basis of the recommended date selected by the recommendation displaying part 104.

In FIG. 7A, the recommendation date for the mowing operation is set to the date "May 21, 2017" in the recommendation displaying part 104, and thus the creation supporting part 85 assigns the mowing operation to the date corresponding to the recommended date in the scheduled date part 105, and assigns the dates to the tedding operation, the raking operation, and the baling operation in turn.

The assignment of the dates by the creation supporting part 85 is performed on the basis of a relation between the operations and the number of days for the operations. Here, the regular number of days required for each of the operations (the operation period) may be preliminarily registered in the supporting device 84 for each work as the relation between the operations and the number of days for the operation, the date may be allocated after obtaining the relation between the operations and the number of clays for the operations on the basis of the past result, and the dates may be allocated after the relation between the operations and the number of days for the operations is obtained by another method. For example, in the scheduled date part 105, the tedding operation is set to a period "5/22 to 5/24", and the raking operation and the baling operation are set to a date "5/25".

Meanwhile, in the embodiment described above, the creation supporting part 85 automatically creates the relation between the operations and the dates in the scheduled date part 105; however, the administrator or the like can manipulate the supporting device 84 to arbitrarily set the relation between the operations and the dates in the scheduled date part 105, and the configuration is not limited to the embodiment described above. When the button (a registration button) 106 displayed on the creation screen M1 is selected, the operation plan set on the creation screen M1 is stored in the storing part 84c of the supporting device 84.

As described above, the creation supporting part 85 supports the operation plan on the basis of the weather information. Thus, it is possible to recommend or set an appropriate date, an appropriate operation period, and the like for a series of the operations from the mowing operation, the tedding operation, the raking operation, and the baling operation on the basis of the weather information for a predetermined period, for example.

As described above, when the mowing operation is performed, the mowing position and the first moisture value can be obtained by the mower 1A. When the external device 83 is connected to an outputting device 85A of the mower 1A, the mowing position and the first moisture value detected in the mowing operation can be stored in the external device 83.

Then, when the external device 83 is connected to the connecting portion 84c of the supporting device 84, the storing part 84c of the supporting device 84 can obtain and store the mowing position and the first moisture value stored in the external device 83.

In this manner, using the mowing position and the first moisture value detected in the mowing operation, the creation supporting part 85 supports the creation of the operation plans for the working machine (either one of the tedder 1B, the rake 1C, and the roll baler 1D), the operation plan being performed after the mowing.

Figure 7B:
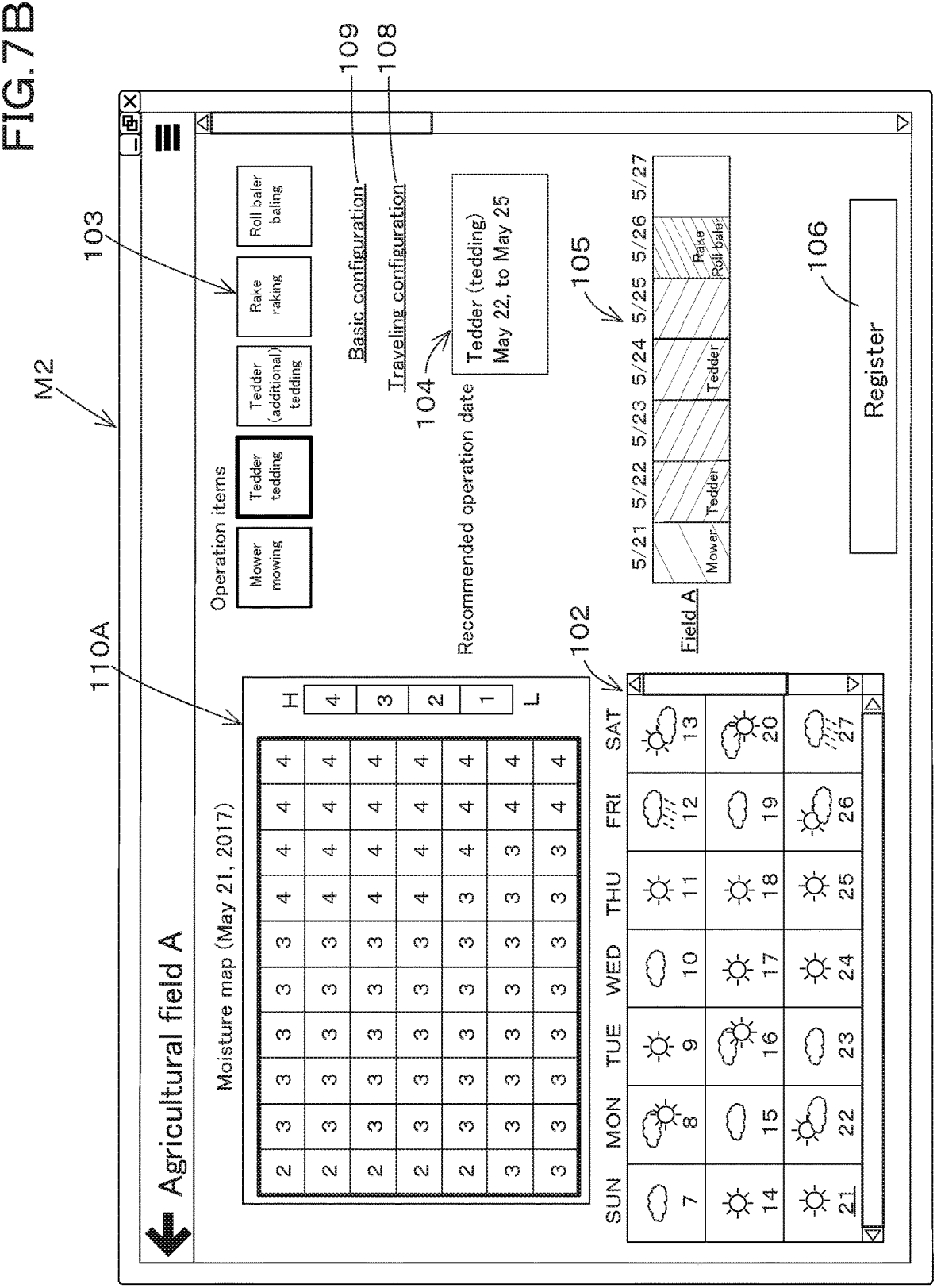
FIG. 7B is a view illustrating a creation screen M2 according to the embodiment.

FIG. 7B shows a creation screen M2 of the case where the operation item part 103 is changed to the tedding operation after the mowing operation is set as shown in FIG. 7A. It should be noted that the weekly weather forecast 102, the operation item part 103, and the scheduled date part 105 are displayed on the creation screen M 2 of FIG. 7B, which is the same as FIG. 7A.

The creation supporting part 85 displays the moisture map 110A on, for example, the creation screen M2 in the creation of the operation plan. As shown in FIG. 1, the moisture map 110A is a map created by the moisture map creating part 87. The moisture map creating part 87 is constituted of electric/electronic parts disposed on the supporting device 84, programs incorporated in the calculating part 84a (the supporting device 84), and the like. The moisture map creating part 87 creates a moisture map 110A of the agricultural field on the basis of the first moisture value and the mowing position.

In particular, the moisture map creating part 87 refers to the storing part 84c and judges whether or not the first moisture value and the mowing position detected in the mowing operation at a predetermined date are stored. For example, the moisture map creating part 87 judges whether or not the first moisture value and the mowing position detected in the mowing operation on May 21 are stored in the storing part 84c as shown in FIG. 7B. When the first moisture value and the mowing position in the mowing operation on May 21 are stored in the storing part 84c, the moisture map creating part 87 creates the moisture map 110A in which the first moisture value and the mowing position are associated with each other.

Meanwhile, in the creation of the moisture map 110A, the moisture map creating part 87 may previously set a level indicating a magnitude of the moisture value into several steps (for example, four steps), and may map the steps respectively corresponding to the moisture values in the moisture map 110A, may map the moisture value itself in the moisture map 110A, or may map the average value of the moisture value in a predetermined area in the moisture map 110A, and thus the method of creating the moisture map 110A by the moisture map creating part 87 is not limited to the above-described method.

In this manner, the moisture map 110A in the mowing operation is displayed at least on the creation screen M2 for setting the operation plan after the mowing. Thus, in the case, for example, where the administrator or the like can arbitrarily change the relation between the operation and the date in the scheduled date part 105 of the creation screen M2, the administrator arbitrarily adjusts the date of the tedding operation with reference to the moisture map 110A.

For example, when the moisture value displayed in the moisture map 110A is lower than a predetermined value, the operation period of the tedding operation is shortened in the scheduled date part 105. On the other hand, when the moisture value displayed on the moisture map 110A is higher than a predetermined value, the operation period of the tedding operation can be extended in the scheduled date part 105.

FIG. 7B shows an example in which the operation period of the tedding operation (the operation plan in FIG. 7A) set at the time of planning the mowing operation is extended by a single day from the period "5/22 to 5/24" to the period "5/22 to 5/25".

In the embodiment described above, while the manager or the like watches the moisture map 110A displayed on the creation screen M2, the manager or the like arbitrarily changes the date indicated in the scheduled date part 105 of the creation screen M2; however, the creation supporting part 85 may set the date of the operation in the operation plan on the basis of the first moisture value.

The creation supporting part 85 extracts the first moisture value in the agricultural field A (a predetermined field) obtained in the mowing operation from the storing part 84c, the first moisture value being obtained in the mowing operation. For example, the creation supporting part 85 obtains an average value (a past moisture value) of the first moisture value in the agricultural field A, and compares the past moisture value with the set value (a target moisture value) set by the supporting device 84 and the like.

When the moisture difference between the past moisture value and the target moisture value (the past moisture value—the target moisture value) is given in the direction of plus, the creation supporting part 85 sets the operation period of the tedding operation to be long, and when the moisture difference between the past moisture value and the target moisture value is given in the direction of minus, the operation period of the tedding operation is set to be short.

The creation supporting part 85 does not change the operation period of the tedding operation when there is almost no moisture difference between the past moisture value and the target moisture value and is within a predetermined range. The creation supporting part 85 changes the date by displaying the operation period of the tedding operation on the recommendation displaying part 104, the operation period being obtained based on the first moisture value, or by applying the operation period of the tedding operation to the scheduled date part 105.

In this manner, the creation supporting part 85 can change (adjust) the operation period of the tedding operation on the basis of the first moisture value. Therefore, it is possible to adjust the tedding operation even if the administrator or the like is not an expert. In addition, when the operation period is displayed on the recommendation displaying part 104, a final operation period can be set while referring to the operation period displayed on the recommendation displaying part 104.

The creation supporting part 85 may set the number of operations in the operation plan on the basis of the first moisture value. FIG. 7C shows a modified example of the scheduled date part 105 on the creation screen. The scheduled date part 105 is configured to set the number of times of the operations on the identical date. The scheduled date part 105 is configured to set at least the number of times of the tedding operations. For example, when the tedding operation on 5/22 is selected, the number of times of the tedding operations can be arbitrarily set at the selected date.

For example, it is assumed that the number of times of the tedding operation has been set to a plurality of times in advance in the scheduled date part 105 of the creation screen M1 for setting the mowing operation. Then, when the creation screen M2 is displayed after the mowing operation is finished, the creation supporting part 85 calculates the moisture difference between the past moisture value and the target moisture value, and when the moisture difference is given in the direction of plus, the number of times of the tedding operations is increased, and when the moisture difference is given in the direction of minus, the number of times of the tedding operations is reduced. The creation supporting part 85 does not change the number of times of the tedding operations when there is almost no moisture difference between the past moisture value and the target moisture value and is within a predetermined range.

Meanwhile, in the embodiment described above, the creation supporting part 85 is configured to automatically change the number of times of the tedding operations; however, the administrator or the like can manually change the number of tedding operations arbitrarily on the identical date while watching the moisture map 110A.

The creation supporting part 85 may set the date of operation on the basis of the moisture map 110A. As shown in FIG. 8, when the first moisture value of a predetermined area A1 at the time of the mowing operation is biased to be higher than the first moisture values of the other areas in the moisture map 110A, the creation supporting unit 85 calculates the moisture difference between the first moisture value and the target moisture value in the predetermined area A1.

When the moisture difference in the predetermined area A1 is given in the direction of plus, the creation supporting unit 85 sets the operation period of the tedding operation to be long, and when the moisture difference between the past moisture value and the target moisture value is given in the direction of minus, the creation supporting unit 85 sets the operation period of the tedding operation to be short. For example, it is possible to extend the operation period of the tedding operation (the operation plan in FIG. 7A) from the period "5/22 to 5/24" to the period "5/22 to 5/25", and to shorten the operation period of the tedding operation (the operation plan in FIG. 7A) from the period "5/22 to 5/24" to the period "5/22 to 5/23".

In this manner, when there is the predetermined area A1 having a high moisture value in a predetermined agricultural field (the agricultural field A), the operation period (the number of days) is changed with reference to the predetermined area A1, and thereby it is possible to prevent the moisture value of the grass after the mowing operation from being biased.

The creation supporting part 85 may set the number of operations on the basis of the moisture map 110A. As shown in FIG. 8, when the first moisture value of the predetermined area A1 at the time of the mowing operation is biased to be higher than the first moisture values of the other areas in the moisture map 110A, the creation supporting unit 85 increases the number of times of the tedding operation at the identical date. For example, the number of times of the tedding operation on the date "5/22" in FIG. 7C is increased from "2 times" to "3 times". Meanwhile, the number of times of the tedding operation on the identical date is increased in the embodiment described above; however, instead of that, the number of times of the tedding operation may be increased only in the predetermined area A1 having the high first moisture value at the time of the mowing operation. For example, the predetermined area A1 where the number of times of the tedding operation is increased is highlighted and displayed on the moisture map 110A, and the number of the tedding operations in the predetermined area A1 is displayed on the moisture map 110A.

In this manner, when there is the predetermined area A1 having the high moisture value in a predetermined agricultural field (the agricultural field A), the tedding operation is increased only in the predetermined area A1, and thereby the moisture value of the grass pasture after the mowing operation can be prevented from being biased.

FIG. 9A shows a creation screen M3 that is a modified example of the creation screen M1. As shown in FIG. 9A, the weather map 101, the weekly weather forecast 102, the operation item part 103, and the recommendation displaying part 104 are displayed on the creation screen M3.

The creation supporting part 85 displays the scheduled time part 107 configured to display the time (a clock time) for the operation in association with each of the operation items. The creation supporting part 85 assigns an operation item (the operation) to the operation time (the operation time width) on the basis of the recommended date selected by the recommendation displaying part 104. The assignment of the operation time by the creation supporting part 85 is performed based on the relation between the operation and the operation time. Here, a standard operation time for each of the operations may be registered in advance in the supporting device 84 as the relation between the operation and the operation time, the operation time may be assigned based on the relation between the operation and the operation time obtained from the past result, or the operation time may be assigned based on the relation between the operation and the operation time obtained by other methods.

Meanwhile, in the embodiment described above, the creation supporting part 85 automatically creates the relation between the operation and the operation time in the scheduled time part 107. However, the administrator or the like may manipulate the supporting device 84 to arbitrarily set the relation between the operation and the operation time in the scheduled time part 107, and the configuration is not limited to the embodiment described above. When the button (the registration button) 106 displayed on the creation screen M3 is selected, the operation plan set on the creation screen M3 is stored in the storing part 84c of the supporting device 84.

FIG. 9B shows a creation screen M4 that is a modified example of the creation screen M2. As shown in FIG. 9B, the moisture map 110A is displayed on the creation screen M4. Thus, the moisture map 110A in the mowing operation is displayed on the creation screen M4 configured to set the operation plan after the mowing at least. In this manner, for example, when the relation between the operation and the operation time can be arbitrarily changed in the scheduled time part 107 of the creation screen M4, the administrator can arbitrarily change the operation time of the tedding operation with reference to the moisture map 110A.

For example, when the moisture value displayed in the moisture map 110A is lower than a predetermined value, the operation time of the tedding operation in the scheduled time part 107 is shortened. On the other hand, if the moisture value displayed in the moisture map 110A is higher than the predetermined value, the operation time of the tedding operation in the scheduled time part 107 can be extended.

Thus, the moisture map 110A at the time of the mowing operation is displayed on the creation screen M4 configured to set the operation plan after the mowing at least. In this manner, for example, in the scheduled time part 107 of the creation screen M4, the administrator can manually change the operation time of the tedding operation arbitrarily while referring to the moisture map 110A.

In the embodiment described above, the moisture map 110A is displayed on the creation screen M4, and the administrator or the like arbitrarily changes the operation time indicated in the scheduled time part 107 of the creation screen M4. However, the creation supporting part 85 may set the operation time in the operation plan on the basis of the first moisture value.

For example, the creation supporting part 85 compares the past moisture value in the agricultural field A with the target moisture value. When the moisture difference between the past moisture value and the target moisture value is given in the direction of plus, the creation supporting part 85 sets the operation time of the tedding operation to be long, and when the moisture difference between the past moisture value and the target moisture value is given in the direction of minus, the creation supporting part 85 sets the operation time of the tedding operation to be short.

When there is almost no moisture difference between the past moisture value and the target moisture value and is within the predetermined range, the creation supporting part 85 does not change the operation time of the tedding operation. The creation supporting part 85 changes the operation time by displaying the operation time of the tedding operation obtained by the first moisture value on the recommendation displaying part 104 or by applying the operation time of the tedding operation to the scheduled time part 107.

In this manner, the creation supporting part 85 can change (adjust) the operation time of the tedding operation on the basis of the first moisture value. Thus, it is possible to adjust the tedding operation even if the manager or the like is not an expert. In addition, when the operation time is displayed on the recommendation displaying part 104, the final operation time can be set while referring to the operation time displayed on the recommendation displaying part 104.

The creation supporting part 85 may set the date of operation on the basis of the moisture map 110A. As shown in FIG. 8, when the first moisture value in the predetermined area A1 in the mowing operation is biased to be higher than the first moisture values of the other areas in the moisture map 110A, the creation supporting unit 85 calculates the moisture difference between the first moisture value and the target moisture value in the predetermined area A1.

When the moisture difference in the predetermined area A1 is given in the direction of plus, the creation supporting part 85 sets the operation time of the tedding operation to be long, and when the moisture difference between the past moisture value and the target moisture value is given in the direction of minus, the creation supporting part 85 sets the operation time of the tedding operation to be short.

In this manner, when there is the predetermined area A1 having the high moisture value in the predetermined agricultural field (the agricultural field A), the operation time is changed on the basis of the predetermined area A1, and thereby the moisture value of the grass pasture after the mowing operation can be prevented from being biased.

In the embodiment described above, changings of the operation plan for the tedder 1B (changing of date, changing of the number of times, changing of time, and the like) are explained on the basis of the first moisture value or the moisture map. However, that configuration can be employed for the changing of the operation plan for the rake 1C and the roll baler 1D other than the tedder 1B.

In that case, the tedder 1B may be replaced with "the rake 1C" or "the roll baler 1D", and the tedding operation may be read as "the raking operation" or "the baling operation". In addition, the operation plans in the operation (the tedding operation, the raking operation, the baling operation) performed after the mowing operation may be changed in combination on the basis of the first moisture value or the moisture map.

The creation supporting part 85 may set the traveling route for the working machine on the basis of the moisture map 110A. FIG. 10 shows an example of a creation screen M5 configured to set the traveling route for the tedding operation. When "the tedding operation" of the operation item indicated in the operation item part 103 is selected and the travel determining part 108 is selected on the creation screen M2, the creation support part 85 displays the creation screen M5 on the displaying part 84b. On the creation screen M5, the moisture map 110A is displayed.

A traveling route R1 of the tedder 1B configured to perform the tedding operation is displayed on the moisture map 110A. In the moisture map 110A, the creation supporting part 85 sets the traveling route of the tedder 1B in accordance with the level of the first moisture value. For example, when the level of the first moisture value is in four steps (level 1 to level 4), the creation supporting part 85 sets a traveling route R1 of the tedder 1B in the moisture map 110 A, in the order of a region Q1 corresponding to the level 1 that represents the lowest level of the first moisture value, a region Q2 corresponding to a level at which a level of the first moisture value is higher by a single step than the level 1, a region Q3 corresponding to a level at which the level of the first moisture value is higher by a single step than the level 2, and a region Q4 corresponding to a level at which the level of the first moisture value is higher by a single step than the level 3, and the traveling route R1 set above is displayed on the creation screen M5.

In particular, the creation supporting part 85 sets a start position of the tedding operation of the tedder 1B in the area Q1, and sets a first traveling route R1a in the area Q1 in the predetermined agricultural field (the agricultural field A). In addition, the creation supporting part 85 sets the second traveling route R1b in the area Q2, the second traveling route R1b following the first traveling route R1a, sets the third traveling route R1c in the area Q3, the third traveling route R1c following the second traveling route R1b, sets the fourth traveling route R1d in the area Q4, the fourth traveling route R1d following the third traveling route R1c, and then sets an end position of the tedding operation of the tedder 1B in the area Q4.

According to that, the traveling route R1 of the tedder 1B is set sequentially from a position where the first moisture value is low to another position where the first moisture value is high. Thus, it is possible for the tedder 1B to have long time to reach the position with a high first moisture value from a position with a low first moisture value. It is possible to reduce the moisture value on the position where the first moisture value is high, until the tedder 1B reaches the position having the high first moisture value, and thus when the traveling route is devised, it is possible to lower the overall moisture value.

In the embodiment described above, the creation supporting part 85 creates the traveling route R1 in the descending order of the first moisture value. However, the creation supporting part 85A may create the traveling route R1 to increase the number of the traveling of the tedder 1B to two times in the area where the first moisture value is high, for example, the area Q4 and the like. In that case, the fourth traveling route R1d in the area Q4 reciprocates at least in the area Q4 and then travels toward the end position.

In addition, although the traveling route R1 of the tedder 1B is described as an example, that configuration is also applicable to the traveling route R1 of the rake 1C and to the traveling route R1 of the roll baler 1D.

The creation supporting part 85 may support creation of the operation plan on the basis of the grass information. FIG. 11 shows an example of the basic configuration screen M6 for the setting of the operation plan. When a basic configuration part 109 is selected on the creation screen, the creation supporting part 85 displays the basic configuration screen M6 on the displaying part 84b.

On the basic configuration screen M6, a grass determining part 120 configured to perform the setting relating to the grass is displayed. The grass determining part 120 has a determining part 120a configured to set whether to reflect the grass information on the operation plan, a registering part 120b configured to register the grass information, and a grass displaying part 120c configured to display the registered grass information.

The determining part 120a is configured to select ON/OFF. The determining part 120a reflects the grass information on the operation plan when it is ON, and the determining part 120a does not reflect the grass information on the operation plan when it is OFF. Grass information such as the grass names, the grass types, the grass varieties, and the like can be inputted to the registering part 120b. When an administrator or the like uses the supporting device 84 to input the grass information to the registering part 120b of the basic configuration screen M6, the supporting device 84 stores the input grass information in the storing part 84c.

That is, the supporting device 84 includes a grass information obtaining part 88. The grass information obtaining part 88 is constituted of electric/electronic parts disposed on the supporting device 84, programs incorporated in the calculating part 84a (the supporting device 84), and the like. The grass information obtaining part 88 obtains the grass information inputted to the registering part 120b of the basic configuration screen M6.

In the embodiment described above, the supporting device 84 (the grass information obtaining part 88) obtains the grass information inputted to the registering part 120b. However, the grass information may be obtained using an external network or the like. For example, when the basic configuration screen M6 is displayed, the grass information obtaining part 88 connects the supporting device 84 to a server of a company or the like that provides the grass information through an external network (a WAN or the like), and then the grass information obtaining part 88 obtains the grass information.

The grass displaying part 120c displays the names of grasses and the like in the list from among the grass information obtained by the supporting device 84 (the grass information obtaining part 88). The name of grasses or the like displayed on the grass displaying part 120c can be selected.

The creation supporting part 85 extracts the grass information corresponding to the grass name selected in the grass displaying part 120c from the storing part 84c, and adjusts the operation to be set to the scheduled date part 105 and the operation to be set to the scheduled date part 107 on the basis of the extracted grass information.

For example, the moisture value, the hardness, the size, and the like are different depending on the types (varieties) of the grass, and thus some of the varieties are easy to be dried and others of the varieties are hard to be dried even if the weather conditions are the same. The creation supporting part 85 has correction values and the like determined depending on the types (the varieties) of the grass and the like. Thus, the creation supporting part 85 adds the correction value to a standard value (the operation period, the operation time) determined for each operation, or the standard value is multiplied by the correction value. The creation supporting part 85 may support the creation of the operation plan on the basis of the information on the working machine (the machine information).

As shown in FIG. 11, a machine determining part 130 configured to perform the setting relating to the working machine is displayed on the basic configuration screen M6. The machine determining part 130 includes a determining part 130a configured to set whether to reflect the machine information on the operation plan, a registering part 130b configured to register the machine information, and a machine displaying part 130c configured to display the registered machine information.

The determining part 130a is configured to select ON/OFF. The determining part 130a reflects the machine information on the operation plan when it is ON, and the determining part 130a does not reflect the machine information on the operation plan when it is OFF. Machine information such as the names, model numbers, models, owned numbers, and the like of the working machines (the mowers, the tedders, the rake, the roll baler, and the like) can be inputted to the registering part 130b. When an administrator or the like inputs the machine information to the registering part 130b of the basic configuration screen M6 with use of the supporting device 84, the supporting device 84 stores the inputted machine information in the storing part 84c.

That is, the supporting device 84 includes a machine information obtaining part 89. The machine information obtaining part 89 is constituted of electric/electronic parts disposed in the supporting device 84, programs incorporated in the calculating part 84a (the supporting device 84), and the like. The machine information obtaining part 89 obtains the machine information input to the registering part 130b of the basic configuration screen M6.

The machine displaying part 130c displays, in a list, the information (the machine name, the model number, and the like) included in the machine information obtained by the supporting device 84 (the machine information obtaining part 89). The machine information displayed on the machine displaying part 130c can be selected. The size and the like of any one of the mower, the tedder, the rake, the roll baler are different, and the processing capability that can be processed with one machine is different. The large-sized working machines (the mowers, the tedders, the rakes, the roll balers) provide high throughputs per unit time, and the small-sized working machines (the mowers, the tedders, the rakes, the roll balers) provide throughputs per hour lower than the throughputs of the large-sized working machines.

In addition, when an administrator owns a plurality of the working machines of the identical model (the identical model number), the administrator has a processing capacity larger than the processing capacity provided by one working machine. The creation supporting part 85 has a processing capability value (processing capability data) indicating the relation between the machine information and the processing capability, and adjusts, based on the processing capability data, the operation period set in the scheduled date part 105 or the operation time set in the scheduled time part 107.

For example, when the processing capability value is large, the creation supporting part 85 makes the operation period or the operation time shorter than the standard, and when the processing capability value is small, the operation period or the operation time is made longer than the standard.

The creation supporting part 85 may support creation of the operation plan on the basis of the information relating to a shape of the agricultural field. The information relating to the shape of the agricultural field is, for example, an area of the agricultural field (an agricultural field area). The area of the agricultural field will be explained as an example.

As shown in FIG. 11, an agricultural field determining part 140 for setting the agricultural field is displayed on the basic configuration screen M6. The field determining part 140 includes a determining part 140a for determining whether to reflect the agricultural field information on the date setting, the time setting, or the like in the operation plan, and includes a registering part 140b for registering the agricultural field information.

ON/OFF is selectable in the determining part 140a. When it is ON in the determining part 140a, the agricultural field information is reflected on the date setting or the time setting of the operation plan, and when it is OFF in the determining part 140a, the agricultural field information is not reflected on the date setting or the time setting of the operation plan. Agricultural field information such as a name, a position, an area, and the like of the agricultural field can be inputted to the registering part 140b. When an administrator or the like inputs the agricultural field information to the registering part 140b of the basic configuration screen M6 with use of the supporting device 84, the supporting device 84 stores the inputted agricultural field information in the storing part 84c.

That is, the supporting device 84 includes an agricultural field information obtaining part 90. The agricultural field information acquiring unit 90 is constituted of electric/electronic parts disposed in the supporting device 84 computer programs incorporated in the calculating part 84a (the supporting device 84), and the like. The agricultural field information obtaining part 90 obtains the agricultural field information inputted to the registering part 140b of the basic configuration screen M6. When an area of the agricultural field is very large, the processing to the grass may be not completed in one predetermined agricultural field (the agricultural field A) by the working machines (the mower, the tedder, the rake, the roll baler) in a predetermined time unit (in units of single day, in units of six hours, and in units of twelve hours).

The creation supporting part 85 has a standard area of agricultural field (a standard agricultural field area) and adjusts the operation period to be set in the scheduled date part 105 or the operation time to be set in the scheduled time part 107 on the basis of the relation between the area of agricultural field represented by the registered agricultural field information and the standard agricultural field area.

For example, when the agricultural field area is larger than the standard agricultural field area by a predetermined extent or more, the creation supporting part 85 makes the operation period or the operation time longer than the standard, when the agricultural field area is smaller than the standard agricultural field area by a predetermined extent or more, the creation supporting part 85 makes the operation period or the operation time shorter than the standard, and when the agricultural field area is not substantially different from the standard agricultural field area, the creation supporting part 85 does not change the operation period or the operation time.

Note that the information relating to the shape of the agricultural field is not limited to the agricultural field area, the information may be a length (a distance) of the agricultural field, information indicating the shape itself, or other information.

For example, when the maximum length (the maximum distance) of the agricultural field is larger than the standard agricultural field distance by a predetermined extent or more, the creation supporting part 85 makes the operation period or the operation time longer than the standard, when the maximum distance is smaller than the standard agricultural field distance by a predetermined extent or more, the creation supporting part 85 makes the operation period or the operation time shorter than the standard, and when the agricultural field distance is not substantially different from the standard agricultural field distance, the creation supporting part 85 does not change the operation period or the operation time.

In the above-described embodiment, the operation plan is set based on the first moisture value obtained at the time of the mowing operation. However, the operation plan may be set based on the moisture value obtained at the time of the tedding operation.

As shown in FIG. 1, the grass management system includes a third physical quantity detecting device 150. Similar to the first physical quantity detecting device 81, the third physical quantity detecting device 150 is a device configured to detect a physical quantity relating to the grass, for example, components (a water amount, a protein) and the like contained in the grass. The third physical quantity detecting device 150 is disposed on the tedder 1B. The third physical quantity detecting device 150 obtains the moisture value (referred to as a second moisture value) of the grass during at least the tedding operation by the tedder 1B.

For convenience of the explanation, in the case where the third physical quantity detecting device 150 is a device configured to obtain the second moisture value of the grass during the tedding operation by the tedder 1B, the third physical quantity detecting device 150 is referred to as a "second moisture obtaining device".

The second moisture obtaining device 150 is disposed on the tedding portion 33, and the second moisture value of the grass is obtained by the tedding portion 33 at the time of the tedding of the grass. For example, the second moisture obtaining device 150 is a spectroscopic analyzer configured to irradiate a light source having a predetermined frequency to the grass and receives a light reflected from pasture, and thereby the second moisture obtaining device 150 analyzes the moisture of the grass. The second moisture obtaining device 150 is connected to the control device 15 or the storage device 16B provided on the tractor 2B. The second moisture obtaining device 150 transmits the obtained second moisture value to the control device 15 or the storage device 16B.

For example, when the control device 15 or the second moisture obtaining device 150 detects the start of traveling of the tractor 2B, the start of power transmission from the PTO shaft to the tedding device 3B, and the start of driving of the tedding portion 33, the second moisture obtaining device 150 starts obtaining the second moisture value. In addition, when the control device 15 or the second moisture obtaining device 150 detects the termination of traveling of the tractor 2B, the termination of power transmission from the PTO shaft to the tedding device 3B, and the termination of driving of the tedding portion 33, the second moisture obtaining device 150 terminates the obtaining of the second moisture value.

In addition, the start of and the termination of obtaining of the second moisture value performed by the second moisture obtaining device 150 are not limited to the above-mentioned examples. For example, the start of and the termination of obtaining of the second moisture value may be performed when an operation device disposed around the operator seat of the tractor 2B is operated, when the start of or the termination of the tedding operation is instructed by a display device, a switch, or the like disposed around the operator seat, or the like. Alternatively, a switch or the like configured to instruct the second moisture obtaining device 150 to start obtaining the second moisture value or to terminate obtaining the second moisture value may be disposed around the operator seat.

In addition, when the obtaining of the second moisture value is being performed by the tedder 1B, at least the position (the latitude and the longitude) is detected by the position detecting device 60B, and the position (the tedding position) and the second moisture value each detected are stored in the storage device 16B.

As shown in FIG. 1, the tractor 2B includes an outputting device 82B. The outputting device 82B is a device connected to at least the storage device 16B and configured to output, to the external device 83, the tedding portion and the second moisture value stored in the storage device 16B. For example, the outputting device 82B has a connecting portion configured to be connected to the external device 83, and outputs the tedding portion and the second moisture value to the external device 83 when the external device 83 is connected to the connecting portion.

Figure 12:
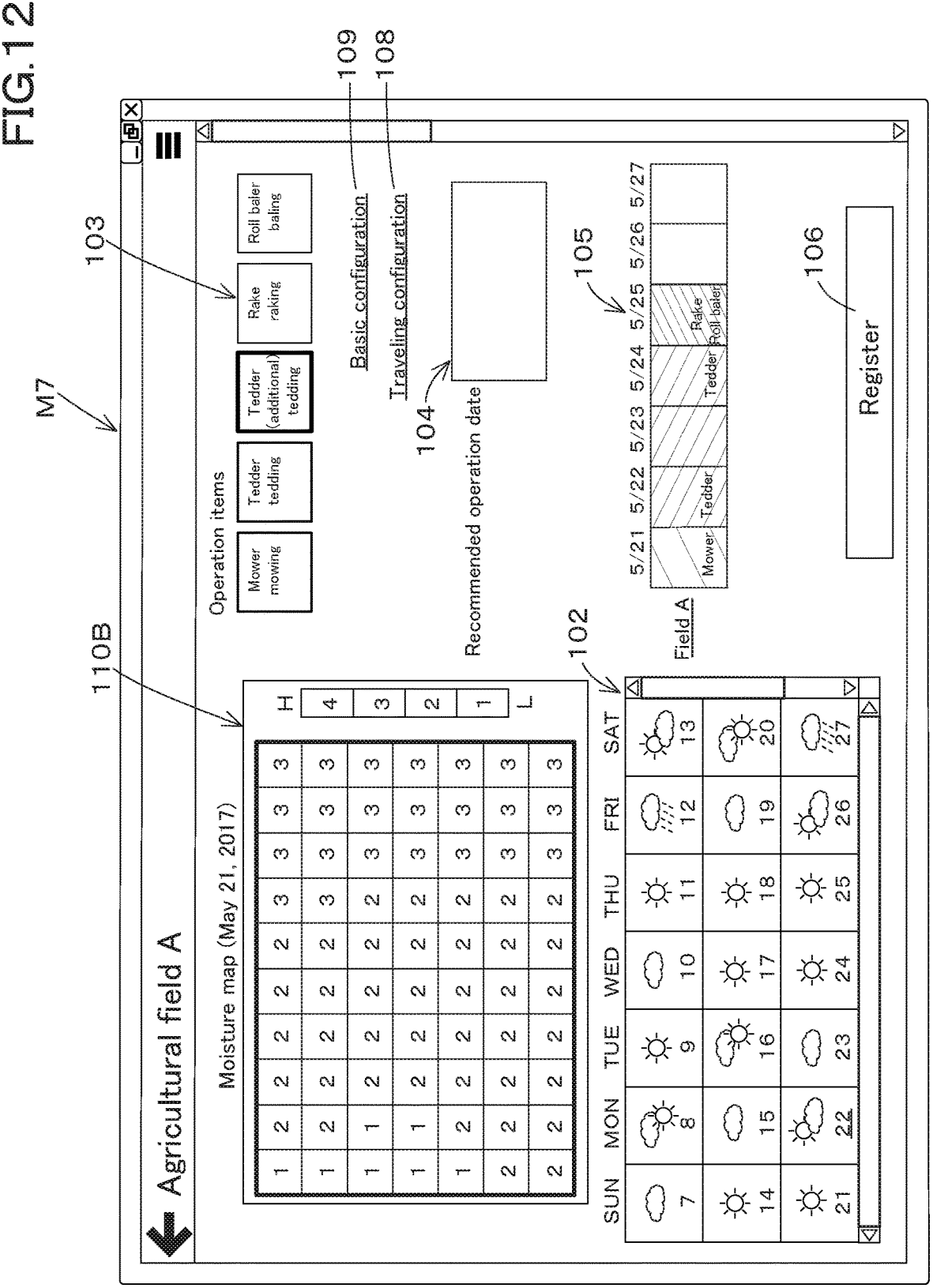
FIG. 12 is a view illustrating a basic configuration determination screen M6 according to the embodiment.

FIG. 12 shows a creation screen M7 of the case where the tedding operation has been completed at least once or more. Meanwhile, the weekly weather forecast 102, the operation item part 103, and the scheduled date part 105 are displayed on the creation screen M7 of FIG. 12.

The creation supporting part 85 displays the moisture map 110B on the creation screen M7 in, for example, the creation of the operation plan. As shown in FIG. 1, the moisture map 110B is a map created by the moisture map creating part 87. The moisture map creating part 87 refers to the storing part 84c and judges whether or not the second moisture value and the tedding portion each detected in the tedding operation on a predetermined date are stored.

For example, the moisture map creating part 87 judges whether or not the second moisture value and the tedding portion each detected in the tedding operation on 5/22 are stored in the storing part 84c. When the second moisture value and the tedding portion in the tedding operation on 5/22 are stored in the storing part 84c, the moisture map creating part 87 creates the moisture map 110B in which the second moisture value and the tedding portion correspond to each other.

For example, in the case where the relation between the operation and the date can be changed arbitrarily in the scheduled date part 105 of the creation screen M7, an administrator can arbitrarily change the date of the next tedding operation with reference to the moisture map 110B, and can change the date of the next tedding operation to the date of the raking operation.

For example, when it is determined that the tedding operation can be changed to the raking operation because the moisture value displayed on the moisture map 110B is lower than a predetermined value, the administrator changes the tedding operation for the next day to the raking operation. On the other hand, when the moisture value displayed on the moisture map 110B is higher than the predetermined value, the operation period of the tedding operation in the scheduled date part 105 can be extended.

In the embodiment described above, the administrator changes the date with reference to the moisture map 110B displayed on the creation screen M7. However, the creation supporting part 85 may automatically set the date of the operation in the operation plan on the basis of the second moisture value or the moisture map 110B. In addition, the creation supporting part 85 may automatically set the number of times of the operation in the operation plan on the basis of the second moisture value or the moisture map 110B.

Meanwhile, the operation of the creation supporting part 85 that changes the date of the operation, the number of times of the operation, and the like based on the second moisture value or the moisture map 110B may be applied by replacing the above-described "first moisture value" with the "second moisture value" and replacing the above-described "moisture map 110A" with the "moisture map 110B".

In addition, when the scheduled date part 105 of the creation screen M7 is changed to the scheduled time portion 107, the time of the operation can be changed based on the second moisture value or the moisture map 110B. Meanwhile, the operation of the creation supporting part 85 that changes the time of the operation and the like based on the second moisture value or the moisture map 110B may be applied by replacing the above-described "first moisture value" with the "second moisture value" and replacing the above-described "moisture map 110A" with the "moisture map 110B".

The changing of the operation plan in the second moisture value can also be applied to the changing of the operation plans of the rake 1C and the roll baler 1D other than the tedder 1B. In that case, the tedder 1B may be replaced with the "rake 1C" or the "roll baler 1D", and the tedding operation may be replaced with the "raking operation" or the "baling operation". In addition, based on the first moisture value or the moisture map, the operation plans in the operations (the tedding operation, the raking operation, and the baling operation) to be performed after the mowing operation may be changed in combination.

Further, in the above-described embodiment, the operation plans of the date, the time, the number of times, and the traveling route are adjusted (set) based on the first moisture value or the moisture map. However, when a plurality of the working machines are provided, the order of the operations for each of the working machines may be adjusted (set).

For example, as shown in FIG. 10, the second tedder 1B may perform the tedding operation in a region Q4 where the first moisture value is high, separately from the first tedder 1B while the first tedder 1B performs the tedding operation in a traveling route defined by the moisture map (the first moisture value).

In addition, for example, in the case where the mower 1A is performing the mowing operation in the agricultural field A under a state where an administrator or the like possesses the mower 1A and the tedder 1B and performs the operations on the identical date or the identical operation time, the creation supporting part 85 may display, on the creation screen, that "the mower 1A is not allowed to perform the mowing operation in in the agricultural field B, while the tedder 1B is allowed to perform the tedding operation".

Further, when the number of the traveling vehicles is different from the number of the devices configured to be mounted on the traveling vehicles (the mowing device 3A, the tedding device 3B, the raking device 3C, and the baling device 3D), the creation supporting portion 85 may support the creation of the operation plan on the basis of the relation between the number of the traveling vehicles and the number of devices configured to be mounted on the traveling vehicle.

For example, in the case where the two devices (one mowing device 3A and one tedding device 3B) are provided to one traveling vehicle, the creation supporting part 85 displays, on the creation screen, that the tedding device 3B is not allowed to perform the tedding operation in the agricultural field A during the mowing device 3A performs the mowing operation.

Further, in the above-described embodiment, the first moisture value and the mowing position are values obtained in the just previous operation by the working machine. However, the past actual result values may be used. For example, the operation plan of the subsequent working machines (the tedder 1B, the rake 1C, and the roll baler 1D) may be adjusted for the operation for the identical agricultural field with use of the first moisture value and the mowing position (the result information) obtained in the mowing operation performed several months ago or one-year ago from the present time.

Now, the first physical quantity detecting device 81 is configured to detect the height of the grass (the grass height) growing in the agricultural field as a physical quantity (the first physical quantity information) relating to the grass. The first physical quantity detecting device 81 detects the grass height at the time of the mowing operation performed by the mower 1A. For convenience of the explanation, the height of the grass (the grass height) is referred to as a grass height value.

The first physical quantity detecting device 81 is disposed on the tractor 2A or the mowing portion 23, and is configured to detect the grass height value of the grass growing from the agricultural field just before the mowing. The grass information obtained in the mowing operation is transmitted to the control device 15 or the storage device 16A, and is stored in the storage device 16A. Since the start and end of the obtaining of the grass height value in the first physical quantity detecting device 81 are the same as the timing of the detection of the first moisture value as described above, the explanation is omitted.

In addition, in the case where the obtaining of the grass height value is being performed in the mower 1A, the mowing position (the first machine position), which is the position obtained at the time of the mowing operation, is detected in the position detecting device (the first position detecting device) 60A, and the mowing position and the grass height value are stored in the storage device 16A as shown in FIG. 13.

As shown in FIG. 1, the grass management system includes a second physical quantity detecting device 151. The second physical quantity detecting device 151 is a device configured to detect a weight (an yield) of the grass, and the like as a physical quantity relating to the grass (the second physical quantity information). The second physical quantity detecting device 151 is disposed on the roll baler 1D. The second physical quantity detecting device 151 obtains the weight (yield) of the grass in the baling operation performed by the roll baler 1D. The second physical quantity detecting device 151 is constituted of a load cell or the like that is configured to detect a weight, and is disposed on the baling portion 57 or the discharging portion 58. The second physical quantity detecting device 151 measures the weight of the baled material as the weight of grass, the baled material being prepared to be discharged from the discharging portion 58 to the field.

For example, the second physical quantity detecting device 151 detects the weight of the baled material, that is, the yield of the grass at the time of discharging, to the agricultural field, the baled material formed by the baling part 57 of the roll baler 1D. The second physical quantity detecting device 151 is connected to the control device 15 or the storage device 16D each disposed on the tractor 2D. The second physical quantity detecting device 151 transmits the obtained weight (yield) of the baled material to the control device 15 or the storage device 16D.

In addition, in the case where the obtaining of the grass yield is performed in the roll baler 1D, the position detecting device (the second position detecting device) 60D detects the baling position (the second machine position) that is the position obtained in the baling operation, and the storage device 16D stores the baling position and the yield as shown in FIG. 14. Meanwhile, since the roll baler 1D detects the weight (yield) of the baled material at the time of the discharging the baled material, the baling position corresponding to the weight (yield) of the baled material indicates the discharge position of the baled material.

As shown in FIG. 1, the tractor 2D includes an outputting device 82D. The outputting device 82D is connected to at least the storage device 16D and is a device configured to output the yield and the baling position to the external device 83, the baling position being including the discharge position stored in the storage device 16D. The outputting device 82D has a connecting portion configured to be connected to the external device 83. When the external device 83 is connected to the connecting portion, the outputting device 82D outputs, to the external device 83, the yield and the baling position including the discharge position.

The supporting device 84 includes a database. In the embodiment, the database is the same as the storing part 84c. Meanwhile, the storing part 84a and the database described above may be separately configured. The storing part 84c stores the first physical quantity information (the grass height value) of the grass, the first machine position (the mowing position), the second physical quantity information (the yield) of the grass, and the second machine position (the baling position).

For example, when the external device 83 storing the mowing position and the grass height value to the supporting device 84 after the mowing operation by the mower 1A, the mowing position and the grass height value stored in the external device 83 are transferred to the storing part 84a.

In addition, when the external device 83 storing the yield and the baling position including the discharge position is connected to the supporting device 84 after the mowing operation by the mower 1A, the yield and the baling position including the discharge position stored in the external device 83 are transferred to the storing part 84c. Therefore, the storing part 84c is configured to store the grass height and the mowing position obtained in the mowing operation and the yield and the baling position obtained in the baling operation. The grass height and the mowing position obtained in the mowing operation and the yield and baling position obtained in the baling operation can be displayed on the displaying part (the display device) 84b, the grass height, the mowing position, the yield, and baling position being stored in the storage section 84c.

Meanwhile, the storing part 84a may store the grass height and the mowing position in each mowing operation, the grass height and the mowing position being obtained in the mowing operation. In addition, the storing part 84a may store the yield and the baling position in each baling operation, the yield and the baling position being obtained in the baling operation. That is, the storing part 84a stores the grass height, the mowing position, the yield, and the baling position every several months, every year, and the like, for example.

As described above, the database is configured to store the grass height obtained in the mowing operation and the yield obtained in the baling operation. In this manner, since it is possible to know a relation between the grass height and the yield, the relationship can be reflected on the operations such as the fertilization.

The grass management system includes a first map creating part 161 and a second map creating part 162. The first map creating part 161 and the second map creating part 162 are provided in the supporting device 84. That is, the first map creating part 161 and the second map creating part 162 are constituted of electric/electronic parts provided in the supporting device 84, programs incorporated in the calculating part 84a (the supporting device 84), and the like.

Figure 15:
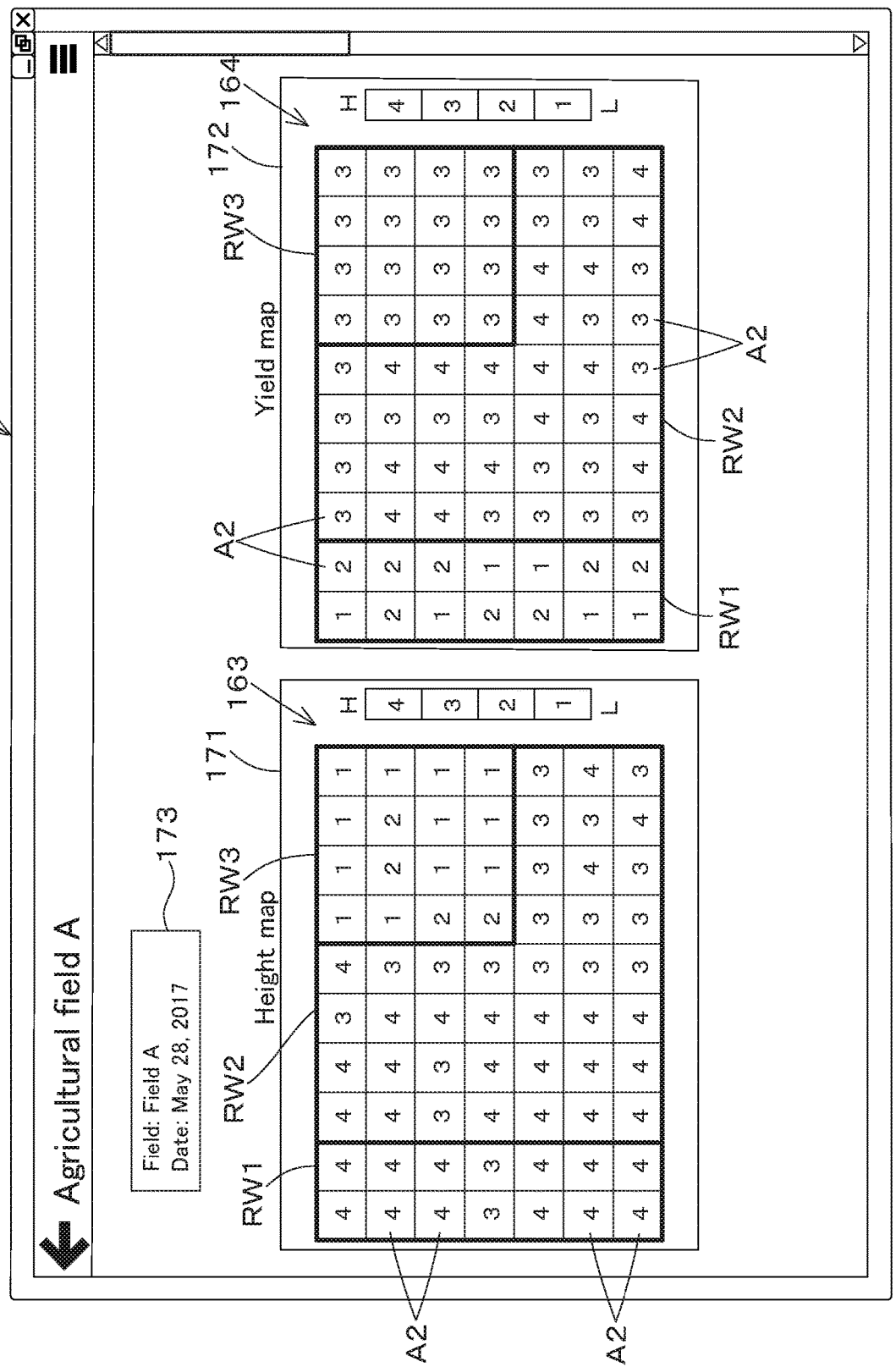
FIG. 15 is a view illustrating an agricultural field screen M10 according to the embodiment.

The first map creating part 161 creates a first physical quantity map 163 of the grass in the agricultural field on the basis of the grass height value and the mowing position. The second map creating part 162 creates a second physical quantity map 164 of the grass in the agricultural field on the basis of the yield of grass and the baling position. Referring to FIG. 15, the first physical quantity map 163 and the second physical quantity map 164 will be described.

FIG. 15 shows an agricultural field map (an agricultural field screen) M10 displayed on the displaying part 84b.

When an administrator or the like operates the supporting device 84, the displaying part 84b of the supporting device 84 displays the agricultural field screen M10. The agricultural field screen M10 has a first displaying part 171 for displaying the first physical quantity map 163, a second displaying part 172 for displaying the second physical quantity map 164, and a setting part (determining part) 173 for setting (determining) the agricultural fields and dates and the like.

The first map creating part 161 refers to the storing part 84c and extracts the grass height and the mowing position corresponding to the date and the agricultural field set by the setting part 173. The first map creating part 161 creates a first physical quantity map 163 in which the grass height and the mowing position are associated with each other. In the creation of the first physical quantity map 163, the first map creating part 161 previously sets levels indicating the height of grass in several steps (for example, four steps), maps the grass height values corresponding to the respective levels in a map, and then displays the map on the first displaying part 171.

For example, the first map creating part 161 divides a predetermined agricultural field (the agricultural field A) into a plurality of predetermined areas A2, obtains an average grass height value of the grass height values in each predetermined area A2, and then assigns any one of the levels to each of the average grass height values. The first map creating part 161 defines the level with the lowest average grass height value as "Level 1", defines the level with the highest average grass height value as "Level 4", defines the level with an average grass height value next higher than "Level 1" as "Level 2", defines the level with an average grass height value next higher than "Level 2" as "Level 3", defines the level with an average grass height value next higher than "Level 3" as "Level 4".

The first map creating part 161 creates the first physical quantity map 163 by identifying the levels 1 to 4 by numerals, figures, characters, colors, and the like.

Meanwhile, the first map creating part 161 may indicate the grass height value itself as a map, or may indicate the average values of the grass height values in a predetermined range as a map. And thus, the method for creating the first physical quantity map 163 by the first map creating part 161 is not limited to the above-described method.

The second map creating part 162 refers to the storing part 84c, and extracts the yield and the mowing position corresponding to the date and the agricultural field set by the setting part 173. The second map creating part 162 creates a second physical quantity map 164 in which the yield and the baling position are related to each other. In the creation of the second physical quantity map 164, the second map creating part 162 previously sets levels indicating the yield of grass in several steps (for example, four steps), maps the yield values corresponding to the respective levels in a map, and then displays the map on the second displaying part 172.

For example, the second map creating part 162 divides a predetermined agricultural field (the agricultural field A) into a plurality of predetermined areas A2, obtains an average yield value of the yield of grass in each predetermined area A2 (an average value per an area unit in the predetermined area A2), and then assigns any one of the levels to each of the average yield values.

Figure 16:
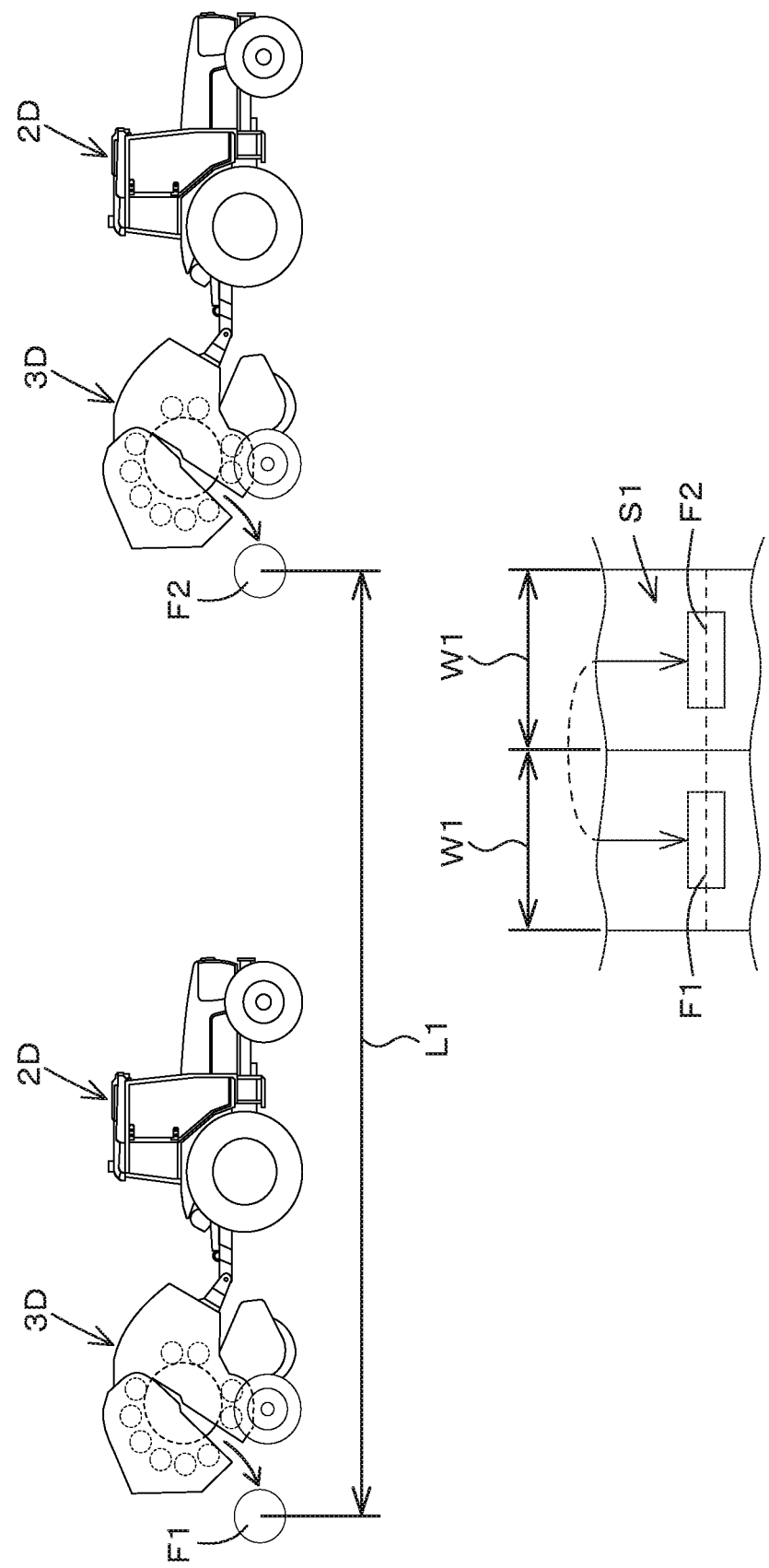
FIG. 16 is an explanation view explaining the yield according to the embodiment.

In particular, as shown in FIG. 16, a collection area S1 is obtained after discharging the preceding baled material F1 on the basis of the moving distance L1 to the next baled material F2 and the raking width W1 by the rake 1C, and the average yield value per unit area is obtained by dividing the weight (yield) of the baled material F2 by the collection area S1. Meanwhile, the method of calculating the average yield value is just an example, and the method is not limited to that.

Then, the second map creating part 162 defines the level with the lowest average yield value as "Level 1", defines the level with the highest average yield value as "Level 4", defines the level with an average yield value next higher than "Level 1" as "Level 2", defines the level with an average yield value next higher than "Level 2" as "Level 3", defines the level with an average yield value next higher than "Level 3" as "Level 4". The second map creating part 162 creates the second physical quantity map 164 by identifying the levels 1 to 4 by numerals, figures, characters, colors, and the like.

Meanwhile, the second map creating part 162 may indicate the yield value itself as a map, and thus the method for creating the second physical quantity map 164 by the second map creating part 162 is not limited to the above-described method. In addition, a map corresponding to the date is displayed on the agricultural field screen M10 described above by designating the date. However, a map corresponding to the clock time may be displayed by specifying the time (the clock time).

In this manner, by displaying both of the first physical quantity map (the grass height map) 163 and the second physical quantity map (the yield map) 164, an administrator or the like can know a case where the grass height is high but the yield is low (a range RW1), a case where the grass height and yield are substantially reasonable (a range RW2), a case where the grass height is low but the yield is high (a range RW3), and the like as shown in FIG. 15, for example.

That is, it is possible to know the relation between a distribution of the grass height in the agricultural field and coarseness and fineness (whether grass is dense or not). For convenience of explanation, FIG. 15 shows an example of three patterns (RW1, RW2, RW3) in a predetermined field (the agricultural field A) in one drawing, and the range, the numerical value, and the like are not limited to the example.

As shown in FIG. 1, the grass management system includes a landform information obtaining device. The landform information obtaining device is a device configured to obtain landform information of the agricultural field. The landform information obtaining device obtains the height information of the agricultural field as the landform information, the height information being detected at the time of the mowing operation by the mower 1A. In particular, the landform information obtaining device is the position detecting device 60A disposed in the mower 1A.

As described above, the position detecting device 60A detects not only the position (the latitude and the longitude) but also the height (height information) in the vertical direction (a height direction) on the basis of the signal transmitted from the positioning satellite at the time of the mowing operation. The latitude and the longitude detected by the position detecting device 60A are two-dimensional (X-axis direction, Y-axis direction) information, and the height information is information obtained in the vertical direction of the agricultural field (Z-axis direction). And then, the height information is three-dimensional information detected by the position detecting device 60A, that is, the landform information of the agricultural field.

Landform information (the latitude, the longitude, and the height) detected in the mowing operation by the landform information obtaining device (the position detecting device 60A) is stored in the storage device 16A, and can be transferred to the external device 83 through the outputting device 82A.

In addition, the landform information obtaining device may be a device configured to obtain the height information of the agricultural field as the landform information, the height information being detected at the time of the tedding operation by the tedder 1B. For example, the landform information obtaining device is the position detecting device 60B disposed in the tedder 1B. The landform information detected at the time of the mowing operation by the landform information obtaining device (the position detecting device 60B) is stored in the storage device 16B, and can be transferred to the external device 83 through the outputting device 82B.

Further, the landform information obtaining device may be a device configured to obtain the height information of the agricultural field as the landform information, the height information being detected at the time of the tedding operation by the rake 1C. For example, the landform information obtaining device is the position detecting device 60C disposed in the rake 1C. The landform information detected at the time of the mowing operation by the landform information obtaining device (the position detecting device 60C) is stored in the storage device 16C. The storage device 16C is connected to the outputting device 82C, and the outputting device 82C outputs the landform information stored in the storage device 16C to the external device 83.

The landform information obtaining device may be any device configured to obtain the landform information of the agricultural field, and the landform information obtaining device may be the position detecting device 60D disposed in the roll baler 1D or may be another working machine, not limited to the position detecting device 60A, the position detecting device 60B, and the position detecting device 60C.

An imaging device (landform information acquisition section) such as a camera may be disposed in the multicopter, and the image obtained by the imaging device may be employed as the landform information. In addition, a landform information obtaining device constituted of a position detecting device 60 configured to detect the height may be disposed in a fertilizer that applies fertilization to the agricultural field, a spreader that distributes the agricultural medicine, or the like.

As shown in FIG. 1, the grass management system includes an discharge information obtaining part 200 and a route creating part 210. The discharge information obtaining part 200 and the route creating part 210 are disposed in the supporting device 84. That is, the discharge information obtaining part 200 and the route creating part 210 are constituted of electric/electronic parts provided in the supporting device 84, programs incorporated in the calculating part 84a (the supporting device 84), and the like.

The discharge information obtaining part 200 obtains a scheduled discharge position H1 where the baled material formed by the roll baler 1D will be discharged to the agricultural field. The route creating part 210 creates a traveling route R2 of the rake 1C configured to collect the grass prior to the operation by the roll baler 1D on the basis of the landform information and the scheduled discharge position H1.

Figure 17:
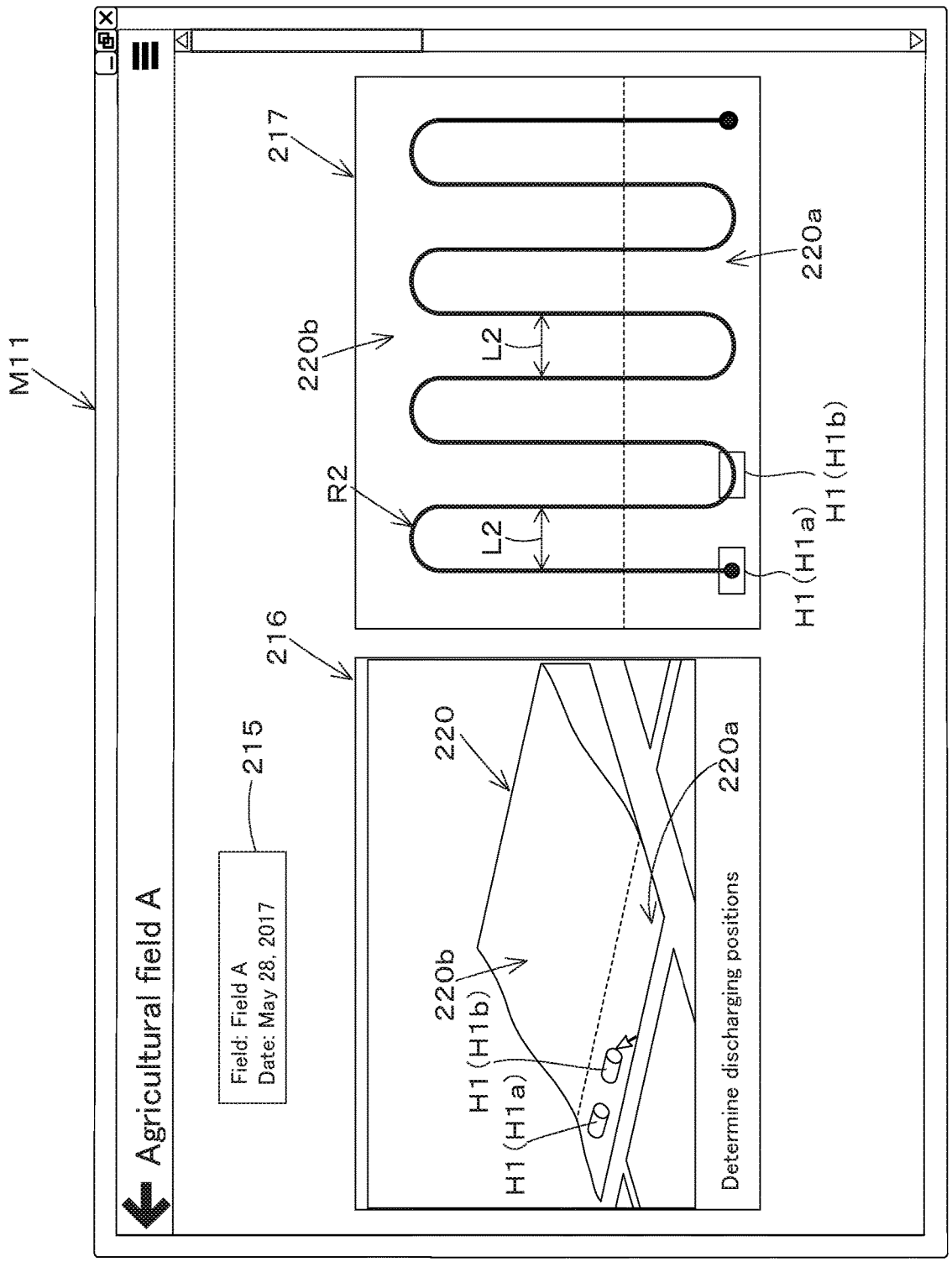
FIG. 17 is a view illustrating a determination screen M11 according to embodiment.

FIG. 17 shows a setting screen M11 provided for setting the traveling route R2 displayed on the displaying part 84b.

When the administrator or the like operates the supporting device 84, the route creating part 210 causes the displaying part 84b of the supporting device 84 to display the setting screen M11. The setting screen M11 has a setting part 215 for setting the agricultural field, a landform displaying part 216 for displaying the landform (a landform map) 220 of the agricultural field, and a route displaying part 217 for displaying the traveling route.

When the agricultural field is set in the setting part 173, the route creating part 210 refers to the storing part 84c, and extracts the landform information corresponding to the agricultural field set by the setting part 215. When there are plural pieces of landform information in the identical agricultural field, the route creating part 210 extracts the latest landform information of the latest date. When there are plural pieces of landform information in the identical agricultural field, the route creating part 210 may display on the setting screen M11 a list of the time or the date of obtaining the landform information, and may extract the landform information selected in the list.

The route creating part 210 displays the three-dimensional landform map 220 on the landform displaying part 216 on the basis of the extracted landform information. In the embodiment described above, the landform map 220 is created based on one landform information in the identical field. However, the landform map 220 may be created using a plural pieces of the landform information of the identical field. When the landform map 220 is created, the route creating part 210 displays the landform map 220 on the landform displaying part 216.

The scheduled discharge position H1 of the baled material in the roll baler 1D can be set on the field of the landform display portion 216, that is, on the field indicating the landform map 220. For example, when the administrator selects a position on the agricultural field of the landform map 220 with use of the input interface (a mouse, a keyboard, or the like) of the supporting device 84, the route creating part (the discharge position determining part) 210 determines the selected position of the agricultural field as the scheduled discharge position H1 of the baled material.

That is, the discharge information obtaining part 200 recognizes the position (the latitude, the longitude) selected on the field of the landform map 220 as the scheduled discharge position H1, and then obtains the scheduled discharge position H1 obtained at the time of the selection. Therefore, the discharge information obtaining part 200 obtains a plurality of the scheduled discharge positions H1 every time when the discharge information obtaining part 200 selects the position on the agricultural field of the landform map 220. Note that the route creating part 200 and the discharge position determining part may be configured separately.

In the embodiment described above, a plurality of the scheduled discharge positions H1 are obtained every time when the discharge information obtaining part 200 selects the position on the agricultural field of the landform map 220. However, when a predetermined range on the field of the landform map 220 is selected by the input interface or the like, the position included in the predetermined range may be obtained as the scheduled discharge position H1.

Meanwhile, It is also possible to judge whether the baled material can be adequately discharged in the setting of the scheduled discharge position H1. That is, as shown in FIG. 1, the grass management system may include a discharge position judging part 230. The discharge position judging part 230 is constituted of electric/electronic parts provided in the supporting device 84, programs incorporated in the calculating part 84a (the supporting device 84), and the like.

The discharge position judging part 230 judges based on the landform information whether the scheduled discharge position H1 can be set. For example, the discharge position judging part 230 judges based on the landform information whether or not the scheduled discharge position H1 selected on the field of the landform map 220 or the periphery of the scheduled discharge position H1 is inclined.

When the periphery of the scheduled discharge position H1 is a downhill inclination or an uphill inclination, the discharge position judging part 230 determines that the scheduled discharge position H1 is not suitable for being set, and displays on the setting screen M11 a warning indicating the scheduled discharge position H1 is ineligible. For example, when the sloped land 220b is selected as the scheduled discharge position, the discharge position judging part 230 determines that the sloped land 220b is ineligible and displays the warning on the setting screen M11.

On the other hand, when the periphery of the scheduled discharge position H1 is flat, the discharge position judging part 230 determines that the scheduled discharge position H1 can be set, displays a figure or the like indicating the scheduled discharge position H1 on the setting screen M11, and stores the scheduled discharge position H1. For example, when the scheduled discharge position H1 is set on the flat land 220a of the landform map 220, the discharge position judging part 230 determines that the scheduled discharge position H1 can be set and stores the scheduled discharge position H1.

In the case where the inclination of the periphery of the scheduled discharge position H1 is slight and the discharged baled material does not roll from the scheduled discharge position H1 even if the periphery of the scheduled discharge position H1 has a downhill inclination or an uphill inclination, the discharge position judging part 230 determines that the scheduled discharge position H1 can be set.

After completion of the setting of the scheduled discharge position H1, the route creating part 210 creates a traveling route R2 of the rake 1C. As shown in FIG. 17, the following explanation will proceed on the assumption that the scheduled discharge position H1 is set on the flat land 220a of the landform map 220, for example.

The route creating part 210 sets the traveling route R2 of the rake 1C along the inclining direction of the sloped land 220b. In other words, when the front side in the landform map 220 is the flat land 220a, the back side in the landform map 220 is the sloped land 220b, and the altitude of the landform map 220 increases as it goes from the front to the back, the route creating part 210 sets the traveling route R2 of the rake 1C along a direction from the front to the back.

The route creating part 210 sets the traveling route R2 of the rake 1C such that the discharge position for discharging the baled material in the roll baler 1D is substantially identical to the scheduled discharge position H1 on the assumption that the traveling route R2 of the rake 1C is the same as the traveling route of the roll baler 1D.

For example, as shown in FIG. 17, when paying attention to two scheduled discharge position H1a and H1b adjacent to the flat portion 220b, the route creating part 210 sets the traveling route R2 of the rake 1C to a trail turning back at the sloped land 220b after separating from the scheduled discharge position H1a and then extending toward the flat portion 220b, and returning to the scheduled discharge position H1b. At the traveling route R2 of the rake 1C, the interval L2 between the adjacent traveling routes R2 is set according to the raking width W1 of the rake 1C or the like, the raking width W1 being set in advance.

Upon creation of the traveling route R2, the route creating part 210 displays the traveling route R2 represented in the two-dimension (X-axis, Y-axis) on the route displaying part 217, for example. After creating the traveling route R2, the route creating part 210 may display the traveling route R2 represented in three-dimension (X-axis, Y-axis, Z-axis) on the route displaying part 217.

Figure 18:
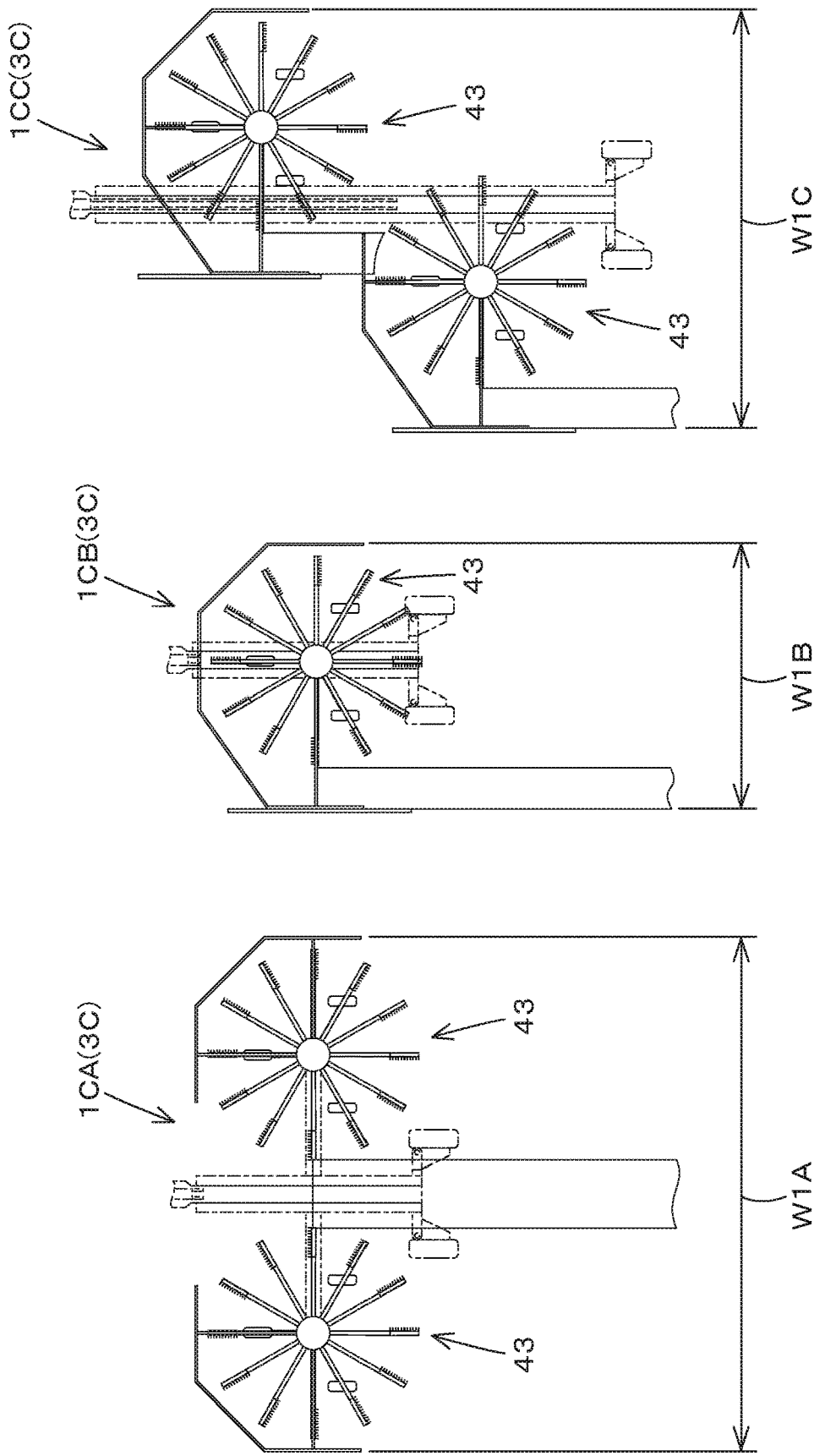
FIG. 18 is a view illustrating types of the rake according to embodiment.

The route creating part 210 may create the traveling route R2 on the basis of the information relating to the rake 1C, that is, the machine information of the rake 1C. As shown in FIG. 18, the rake 1C (the raking device 3C) includes a first type 1CA configure to collect the grass to the center in the width direction of the rake 1C with use of the two raking portions 43, a second type 1CB configured to gather the grass on one side in the width direction of the rake 1C with use of the single raking portion 43, and a third type 1CC configure to collect the grass to the center in the width direction of the rake 1C and gather the grass on one side in the width direction with use of the two raking portions 43. The first type 1CA, the second type 1CB, and the third type 1CC respectively have a width of the raking (the raking width) W1.

When selecting the machine information part 211 displayed on the setting screen M11, the route creating part 210 obtains the machine information of the rake 1C with use of the machine information obtaining part 89 and displays a list of the rakes 1C on the displaying part 35c, the list being stored in the supporting device 84.

The lists of the rakes 1C displayed on the displaying part 35c is selectable. When the machine information corresponding to the first type 1CA is selected, the route creating part 210 sets the raking width W1A of the first type 1CA to the width determined at the time of creation of the traveling route R2. When the machine information corresponding to the second type 1CB is selected, the route creating part 210 sets the raking width W1B of the second type 1CB to the width determined at the time of creation of the traveling route R2. When the machine information corresponding to the third type 1CC is selected, the route creating part 210 sets the raking width W1C of the third type 1CC to the width determined at the time of creation of the traveling route R2.

In the embodiment described above, the traveling route is set based on the landform information and the scheduled discharge position. However, the traveling route may be set based on the height of grass (the grass height) and the scheduled discharge position. As shown in FIG. 1, the grass management system has a grass height obtaining device. In the embodiment, the grass height obtaining device is the first physical quantity detecting device 81 disposed in the mower 1A. The grass height obtaining device and the first physical quantity detecting device 81 may be separately provided.

Figure 19:
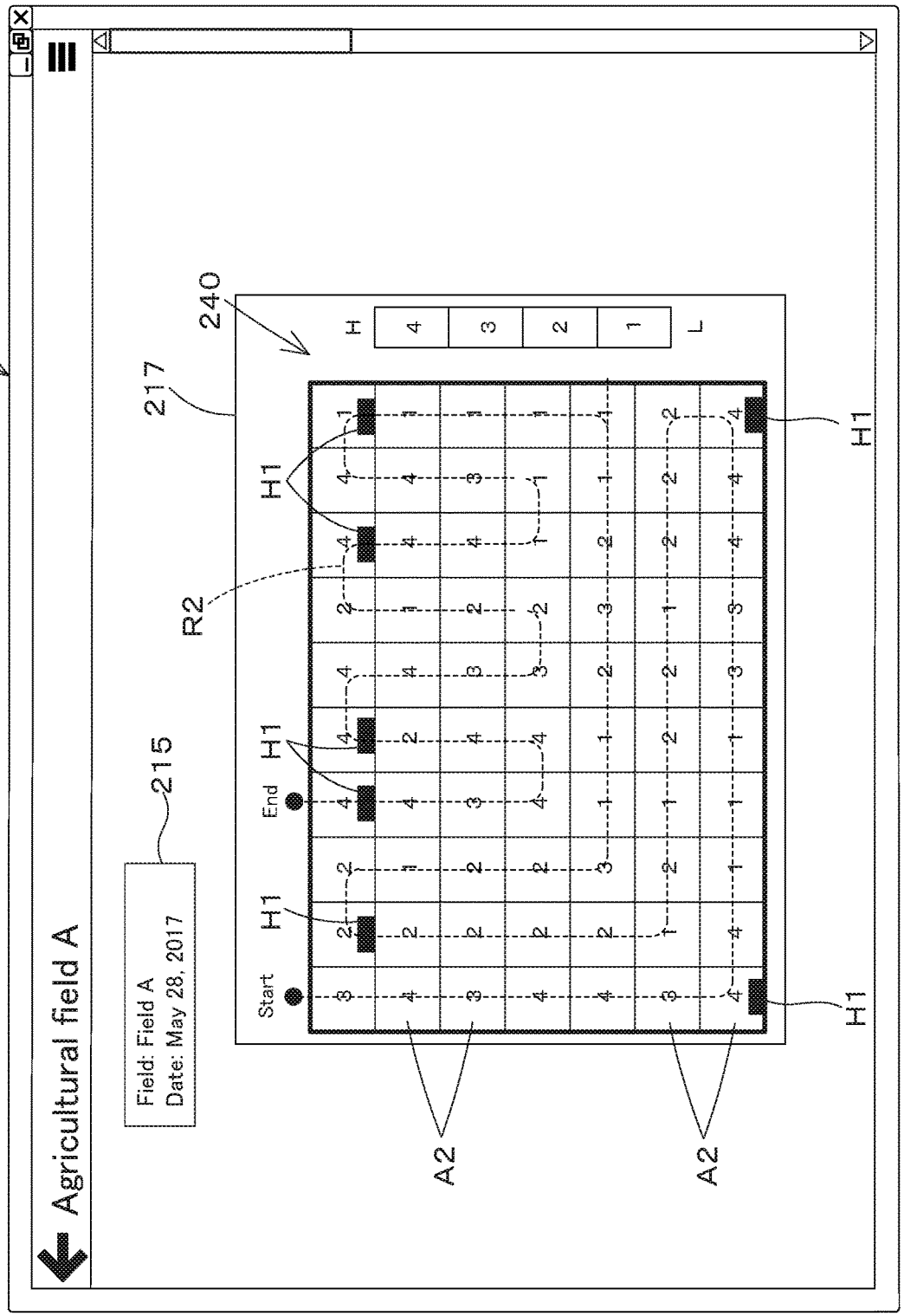
FIG. 19 is a view illustrating a determination screen M12 according to embodiment.

FIG. 19 shows a setting screen M12 for setting the traveling route R2 displayed on the displaying part 84b.

When the administrator or the like operates the supporting device 84, the route creating part 210 causes the displaying part 84b of the supporting device 84 to display the setting screen M12. The setting screen M12 has a setting part 215 for setting the date and the agricultural field, and has a route displaying part 217 for displaying the traveling route and the grass height map of the height of grass (the grass height).

In the route displaying part 217, a scheduled discharge position H1 can be set. The scheduled discharge position H1 can be set by selecting the field of the route displaying part 217 in the same manner as the setting screen M11.

The route creating part 210 refers to the storing part 84c, and extract the grass height and the mowing position each corresponding to the date and the agricultural field. The route creating part 210 divides the grass height map 240 in which the grass height and the mowing position are associated with each other into a plurality of predetermined areas A2, obtains a total height (a grass height amount) of the grass height values for each predetermined area A2, and assigns the grass height amount for each predetermined area A2 by numerals, figures, letters, colors, and the like, and thereby creating a grass height map 240, for example. Meanwhile, the above-described creation of the grass height map 240 is an example and is not limited to the example.

On the field of the traveling route displaying part 217, that is, on the field indicating the grass height map 240, the scheduled discharge position H1 of the baled material in the roll baler 1D can be set in the same manner as the above-described method.

After completion of the setting of the scheduled discharge position H1, the route creating part 210 creates a traveling route R2 of the rake 1C. The route creating part 210 determines the grass height in the predetermined area A2 as the yield in the predetermined area A2. Then, the route creating part 210 determines a position where the total yield obtained by summing the yields (the grass height amounts) of the plurality of predetermined areas A2 corresponds to the weight (the discharge weight) of the baled material discharged from the roll baler 1D as a candidate discharge position, and creates the traveling route R2 such that the candidate discharge position and the scheduled discharge position H1 corresponds to each other.

For example, when the discharged weight of the baled material is 500 kg, the route creating part 210 determines a position where the total yield obtained by summing the yields (the grass height amounts) of the plurality of predetermined areas A2 corresponds to 500 kg as the candidate discharge position, and creates the traveling route R2 such that the candidate discharge position and the scheduled discharge position H1 corresponds to each other.

In the above-described embodiment, the total amount of the grass height values (the grass height amount) is employed as the yield. However, the relation between the grass height value and the yield may be preliminarily represented as data, a conversion formula expressing the relation between the grass height value and the yield may be obtained from the data, and the traveling route R2 may be obtained using the conversion formula or may be obtained in another method.

Meanwhile, it is preferred that the grass management system has a position determining part. The position determining part is disposed in the supporting device 84, for example. The position determining part is constituted of electric/electronic parts provided in the supporting device 84, programs incorporated in the calculating part 84$a$ (the supporting device 84), and the like.

The position determining part sets the positions detected by the position detecting devices 60 (60A, 60B, 60C, and 60D) to the devices (the mowing device 3A, the tedding device 3B, the raking device 3C, and the molding device 3D) on the basis of the relation between the tractors 2A, 2B, 2C, and 2D and the devices (the mowing device 3A, the tedding device 3B, the raking device 3C, and the baling device 3D) connected to at least the tractors 2A, 2B, 2C, and 2D.

The position determining part includes a first position determining part 260A. Based on the positional relation between the tractor 2A and the mowing device 3A, the first position setting part 260A sets the first machine position detected by the first position detecting device 60A to the position (the mowing position) of the mowing device 3A.

As shown in FIG. 2, for example, in order to set the position P1 of the mowing device 3A on the mowing portion 23 in the mowing device 3A, the first position determining part 260A determines the position (the latitude and the longitude) detected by the position detecting device 60A on the basis of the distance between a distance X1 and a distance Y1, the distance X1 being defined in the straight traveling direction between the position detecting device 60A and the position P1 of the mowing device 3A, the distance Y1 being defined in the width direction between the position detecting device 60A and the position P1 of the mowing device 3A, and thereby the first position determining part 260A obtains the position P1 of the mowing device 3A, that is, the mowing position.

Note that the relation between the distance X1 and the distance Y1 can be arbitrarily set by the administrator or the like with use of the interface of the supporting device 84, and the determined distance X1 and the determined distance Y1 are stored in the supporting device 84. In addition, it is preferred that the values of the distances X1 and Y1 are determined depending on the models of the mowers 1A (the mowing device 3A). Further, the first position determining part 260A or the like may have data representing the relation between the models of the mowers 1A (the mowing device 3A) and the distance X1 and the distance Y1.

In addition, although the first position determining part 260A is disposed in the supporting device 84, the first position determining part 260A may be provided on the tractor 1A side, for example, on the control device 15 or the display device of the tractor 1A. In that case, the position set by the first position determining part 260A can be employed as the above-described mowing position (the first machine position).

The position determining part 260 includes a third position determining part 260B. The third position determining part 260B sets the position detected by the position detecting device 60B as the position (the tedding position) of the tedding device 3B on the basis of the positional relation between the tractor 2B and the tedding device 3B.

As shown in FIG. 3, for example, in order to set the space between the tedding portions 33 in the tedding device 3B as the position P2 of the tedding device 3B, the third position determining part 260B determines the position (the latitude and the longitude) detected by the position detecting device 60B on the basis of the distance between a distance X2 and a distance Y2 (Y2 is omitted in the drawing because Y2=0), the distance X2 being defined in the straight traveling direction between the position detecting device 60B and the position P2 of the tedding device 3B, the distance Y2 being defined in the width direction between the position detecting device 60B and the position P2 of the tedding device 3B, and thereby the third position determining part 260B obtains the position P2 of the tedding device 3B, that is, the tedding position.

Note that the relation between the distance X2 and the distance Y2 can be arbitrarily set by the administrator or the like with use of the interface of the supporting device 84, and the determined distance X2 and the determined distance Y2 are stored in the supporting device 84. In addition, it is preferred that the values of the distances X1 and Y1 are determined depending on the models of the tedder 1B (the tedding device 3B). Further, the third position determining part 260B or the like may have data representing the relation between the models of the tedders 1B (the tedding device 3B) and the distance X2 and the distance Y2.

In addition, although the third position determining part 260B is disposed in the supporting device 84, the third position determining part 260B may be provided on the tractor 1B side, for example, on the control device 15 or the display device of the tractor 1B. In that case, the position set by the third position determining part 260B can be employed as the above-described tedding position.

The position determining part 260 includes a fourth position determining part 260C. The fourth position determining part 260C sets the position detected by the position detecting device 60C as the position (the raking position) of the raking device 3C on the basis of the positional relation between the tractor 2C and the raking device 3C.

As shown in FIG. 4, for example, in order to set the space between the raking portions 43 in the raking device 3C as the position P3 of the raking device 3C, the fourth position determining part 260C determines the position (the latitude and the longitude) detected by the position detecting device 60C on the basis of the distance between a distance X3 and a distance Y3 (Y3 is omitted in the drawing because Y3=0), the distance X3 being defined in the straight traveling direction between the position detecting device 60C and the position P3 of the raking device 3C, the distance Y3 being defined in the width direction between the position detecting device 60C and the position P3 of the raking device 3C, and thereby the fourth position determining part 260C obtains the position P3 of the raking device 3C, that is, the raking position.

Note that the relation between the distance X3 and the distance Y3 can be arbitrarily set by the administrator or the like with use of the interface of the supporting device 84, and the determined distance X3 and the determined distance Y3 are stored in the supporting device 84. In addition, it is preferred that the values of the distances X3 and Y3 are determined depending on the models of the rake 1C (the raking device 3C). Further, the fourth position determining part 260C or the like may have data representing the relation between the models of the rakes 1C (the raking device 3C) and the distance X3 and the distance Y3.

Figure 20:
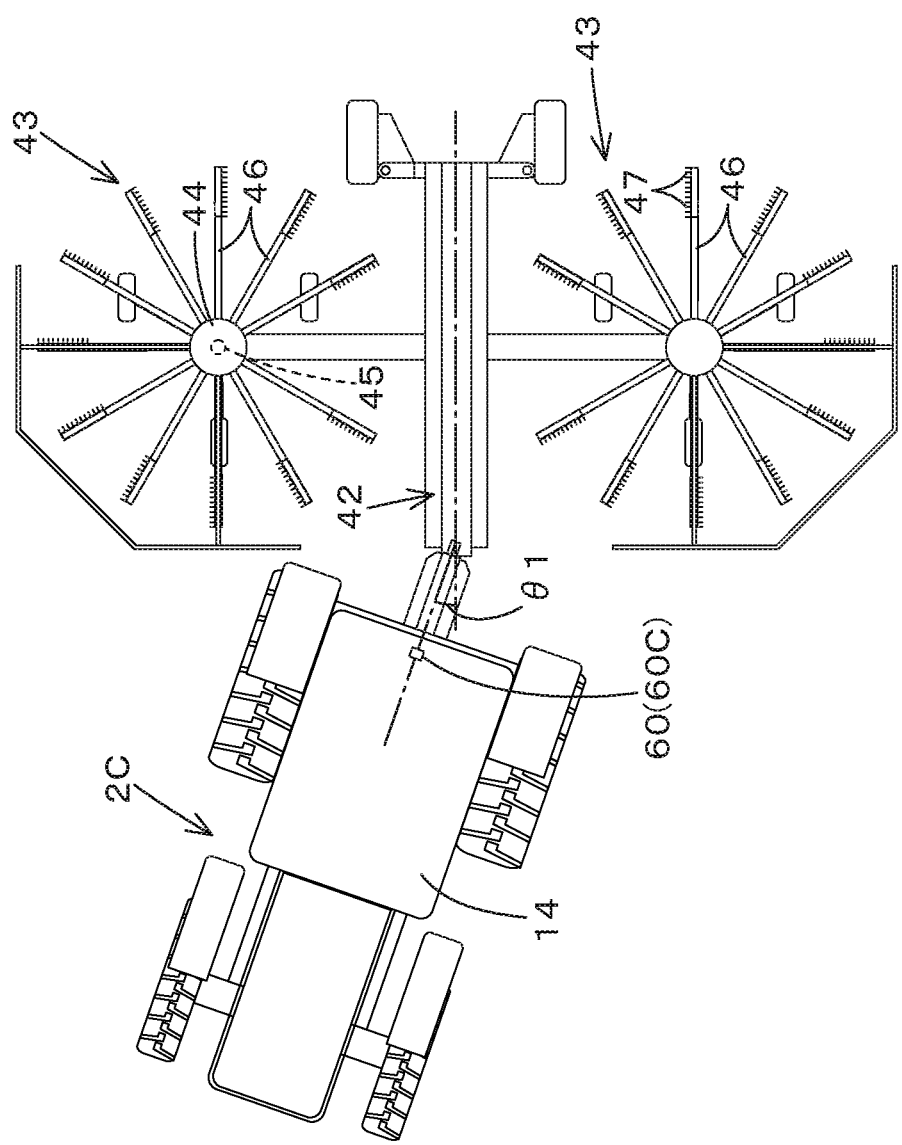
FIG. 20 is an explanation view explaining a relation of connection between the a raking device and a tractor according to the embodiment.

In addition, although the fourth position determining part 260C is disposed in the supporting device 84, the fourth position determining part 260C may be disposed on the tractor 1C side, for example, on the control device 15 of the tractor 1C or on the display device. In that case, the position set by the fourth position determining part 260C can be applied to the raking position described above. Meanwhile, as shown in FIG. 20, in the case where the tractor 2C is steered, the fourth position determining part 260C may correct the raking position in consideration of an angle θ1 of the connecting frame 42 with respect to the connecting section 8 of the tractor 2C.

The position determining part includes a second position determining part 260D. Based on a positional relation between the tractor 2D and the baling device 3D, the second position determining part 260D sets the position (a second machine position) detected by the second position detecting device 60D to the position (a baling position) of the baling device 3D.

As shown in FIG. 5, when the main body 52 of the baling device 3D is set to the position P4 of the baling device 3D, for example, the second position determining part 260D sets the position (the latitude and the longitude) detected by the position detecting device 60C on the basis of a distance between a distance X4 and a distance Y4, the distance X4 being defined in a straight traveling direction between the position detecting device 60D and the position P4 of the baling device 3D, the distance Y4 being defined in a width direction between the position detecting device 60D and position P4 of the baling device 3D (not shown in the drawing because of Y4=0), and thereby the position P4 of the baling device 3D, that is, the baling position is obtained.

Meanwhile, the relation between the distance X4 and the distance Y4 can be arbitrarily set by the administrator or the like with use of an interface of the supporting device 84, and the set distance X4 and the set distance Y4 are stored in the supporting device 84. In addition, the values of the distance X4 and the distance Y4 are preferably set depending on a model of the roll baler 1D (the baling device 3D). In addition, the second position determining part 260D or the like may have the data indicating the relation between the distance X4, the distance Y4, and the model of the roll baler 1D (the baling device 3D).

In addition, although the second position determining part 260D is disposed in the supporting device 84, the second position determining part 260D may be disposed on the tractor 1D side, for example, on the control device 15 of the tractor 1D or on the display device. In that case, the position set by the second position determining part 260D can be applied to the raking position described above.

Meanwhile, in any of the first position determining part 260A, the third position determining part 260B, the fourth position determining part 260C, and the second position determining part 260D, the position of the device may be set using the relation between the position detecting device 60 and a shape model (a two-dimensional shape model) of the devices (the mowing device 3A, the tedding device 3B, the raking device 3C, the baling device 3D).

As described above, since the grass. management system includes the position determining part, it is possible to determine the positions of the mowing operation, the tedding operation, the raking operation, the baling operation more precisely when the position detecting device 60 is disposed on each of the tractors 2A, 2B, 2C, and 2D.

In the above description, the embodiment of the present invention has been explained. However, all the features of the embodiments disclosed in this application should be considered just as examples, and the embodiments do not restrict the present invention accordingly. A scope of the present invention is shown not in the above-described embodiments but in claims, and is intended to include all modifications within and equivalent to a scope of the claims.

The grass management system may include the first moisture obtaining device 81, the position detecting device 60A, and the creation supporting part 85. For example, regarding the configurations other than the first moisture obtaining device 81, the position detecting device 60A, and the creation supporting part 85, it is preferable to constitute the grass management system by combining one or more of "the weather obtaining part 86, the moisture map creating part 87, the grass information obtaining part 88, the machine information obtaining part 89, the agricultural field information obtaining part 90, the second physical quantity detecting device 151, the third physical quantity detecting device 150, the first map creating part 161, the second map creating part 162, the discharge information obtaining part 200, the route creating part 210, and the position obtaining devices 60 B, 60 C, and 60 D".

In addition, the grass management system may include a landform information obtaining device, an discharge information obtaining part 200, and a route creating part 210. For example, regarding the configurations other than the landform information obtaining device, the discharge information obtaining part 200, and the route creating part 210, it is preferable to constitute the grass management system by combining one or more of "the first physical quantity detecting device 81, the position detecting device 60, the creation supporting part 85, the weather obtaining part 86, the moisture map creating part 87, the grass information obtaining part 88, the machine information obtaining part 89, the agricultural field information obtaining part 90, the second physical quantity detecting device 151, the third physical quantity detecting device 150, the first map creating part 161, and the second map creating part 162".

In addition, the grass management system may include the first physical quantity detecting device 81, the first position detecting device 60A, the second physical quantity detecting device 151, the second position detecting device 60D, and the database. For example, regarding the configurations other than the first physical quantity detecting device 81, the first position detecting device 60A, the second physical quantity detecting device 151, the second position detecting device 60D, and the database, it is preferable to constitute the grass management system by combining one or more of "the position detecting devices 60B and 60C, the creation supporting part 85, the weather obtaining part 86, a moisture map creating part 87, the grass information obtaining part 88, the machine information obtaining part 89, the agricultural field information obtaining part 90, the third physical quantity detecting device 150, the first map creating part 161, the second map creating part 162, the landform information obtaining device, the discharge information obtaining part 200, and the route creating part 210".

In addition, the grass management system mentioned above may include at least one working machine (the mower, the tedder, the rake, and the roll baler).

In addition, in the grass management system described above, the tractors 2A, 2B, 2C, and 2D respectively include the outputting devices 82A, 82B, 82C, and 82D each to which the external device 83 is connected. However, instead of that, each of the outputting devices 82A, 82B, 82C, and 82D may be constituted of a communication device configured to perform the short-range wireless communication, or another communication device configured to perform the wireless communication through a cellular phone communication network, a data communication network, or the like, and may be configured to directly or indirectly send the above-mentioned information (the moisture value, the position, the grass height, the yield, and the like) from the tractors 2A, 2B, 2C, and 2D to the supporting device 84.

In addition, any of the creation supporting part 85, the weather obtaining part 86, the moisture map creating part 87, the grass information obtaining part 88, the machine information obtaining part 89, the agricultural field information obtaining part 90, the first map creating part 161, the second map creating part 162, the discharge information obtaining part 200, and the route creating part 210 may be divided into a personal computer owned by an administrator or the like and a server other than the personal computer.

Another grass management system includes a landform information obtaining device configured to obtain a landform of an agricultural field, a discharge information obtaining part configured to obtain a scheduled discharging position at which a baled material is discharged to the agricultural field, the baled material being baled by a roll baler configured to collect and bale grass of the agricultural field, and a route creating part configured to create a traveling route of a rake based on the landform information and the scheduled discharging position before an operation by the roll baler, the rake being configured to rake the grass.

The landform information obtaining device is configured to obtain height information of the agricultural field as the landform information, the height information being detected at least in a mowing operation of the grass performed by a mower.

The landform information obtaining device is disposed on the mower and is configured to detect the height information of the agricultural field based on a signal of a positioning satellite.

The landform information obtaining device is configured to obtain the height information of the agricultural field as the landform information, the height information being detected at least in a tedding operation of the grass performed by a tedder.

The landform information obtaining device is disposed on the tedder and is configured to detect the height information of the agricultural field based on a signal of a positioning satellite.

The grass management system mentioned above includes a display device configured to display a landform map representing a landform of the agricultural field, and a discharging position determination part configured to determine the scheduled discharging position on the landform map that is displayed on the display device.

The grass management system mentioned above includes a discharging position judgment part configured to judge based on the landform information whether the scheduled discharging position of the baled material is allowed to be set in the agricultural field.

Further another grass management system includes a grass height obtaining device configured to obtain height information that is a height of grass in a mowing operation performed by a mower, a discharge information obtaining part configured to obtain a scheduled discharging position at which a baled material is discharged to the agricultural field, the baled material being baled by a roll baler configured to collect and bale grass of the agricultural field, and a route creating part configured to create a traveling route of a rake based on the height of grass and the scheduled discharging position before an operation by the roll baler, the rake being configured to rake the grass.

The grass management system mentioned above includes a machine information obtaining part configured to obtain information relating at least to the rake. The route creating part is configured to create the traveling route based on the information relating to the rake obtained by the machine information obtaining part.

The mower includes a traveling vehicle configured to travel, and a mowing device connected to the traveling vehicle and configured to cut the grass.

The tedder includes a traveling vehicle configured to travel, and a tedding device connected to the traveling vehicle and configured to ted the grass.

The rake includes a traveling vehicle configured to travel, and a raking device connected to the traveling vehicle and configured to rake the grass.

The roll baler includes a traveling vehicle configured to travel, and a baling device connected to the traveling vehicle and configured to bale the grass.

The landform information obtaining device is disposed on any one of the mower configured to mow the grass, the tedder configured to ted the grass, the rake, and the roll baler. The working machine is any one of the mower, the tedder, the rake, and the roll baler provided with the landform information obtaining device includes a storage device configured to store the landform obtained by the landform information obtaining device, and an outputting device configured to be connected to an external device and configured to output the landform information when connected to the external device, the landform information stored in the storage device.

The grass management system mentioned above includes a supporting device configured to be connected to the external device and configured to obtain the landform information from the external device, the supporting device having the route creation part and/or the discharge information obtaining part.

Further another grass management system includes a first physical quantity detecting device configured to detect first physical quantity information of grass in a mowing operation performed by a mower, a first position-detecting device configured to detect a first machine position of the mower, a second physical quantity detecting device configured to detect a second physical quantity information of the grass in an operation where a roll baler collects and bales the grass already mowed, a second position-detecting device configured to detect a second machine position of the roll baler, and a database configured to store the first machine position and the first physical quantity information of the grass and to store the second machine position and the second physical quantity information of the grass.

The grass management system mentioned above includes a first map creating part (a first map creating circuit) configured to create a first physical quantity map of the grass in an agricultural field based on the first machine position and the first physical quantity information of the grass, and a second map creating part (a first map creating circuit) configured to create a second physical quantity map of the grass in the agricultural field based on the second machine position and the second physical quantity information of the grass.

The first physical quantity detecting device detects a height of the grass as the first physical quantity information. The second physical quantity detecting device detects an yield of the grass as the second physical quantity information.

The grass management system mentioned above includes a display device configured to display the first physical quantity information and the second physical quantity information.

The first physical quantity detecting device and the first position-detecting device are disposed on the mower.

The second physical quantity detecting device and the second position-detecting device are disposed on the roll baler.

The mower includes a traveling vehicle configured to travel, and a mowing device connected to the traveling vehicle and configured to cut the grass.

The roll baler includes a traveling vehicle configured to travel, and a baling device connected to the traveling vehicle and configured to bale the grass.

The first position-detecting device is disposed on the traveling vehicle.

The grass management system mentioned above includes a first position determining part configured to determine the first machine position detected by the first position-detecting device as a position of the mowing device based on a relation between the traveling vehicle and the mowing device.

The second position-detecting device is disposed on the traveling vehicle.

The grass management system mentioned above includes a second position determining part configured to determine the second machine position detected by the second position-detecting device as a position of the roll baler based on a relation between the traveling vehicle and the roll baler.

The mower includes a first storage device configured to store the first physical quantity information detected by the first physical quantity detecting device and to store the first machine position detected by the first position-detecting device, and an outputting device configured to be connected to an external device and configured to output the first physical quantity information and the first machine position when connected to the external device, the first physical quantity information and the first machine position being stored in the first storage device.

The roll baler includes a second storage device configured to store the second physical quantity information detected by the second physical quantity detecting device and to store the second machine position detected by the second position-detecting device, and an outputting device configured to be connected to an external device and configured to output the second physical quantity information and the second machine position when connected to the external device, the second physical quantity information and the second machine position being stored in the second storage device.

The grass management system mentioned above includes a supporting device configured to be connected to the external device and configured to obtain any one of the first physical quantity information, the first machine position, the second physical quantity information, and the second machine position from the external device, the supporting device having the database.

The database stores the first physical quantity information and the first machine position both obtained in the mowing operation and stores the second physical quantity information and the second machine position both obtained in the baling operation.

What is claimed is:

1. A grass management system comprising:
   a first moisture-obtaining device to obtain a first moisture value of a grass in a mowing operation performed by a mower;
   a position-detecting device to detect a mowing position of the mower; and
   a creation supporting circuit to support creation of an operation plan for a working machine based on the first moisture value and the mowing position, the working machine being configured to perform an operation relating to the grass already mowed,
   wherein the working machine includes a tedder having a traveling vehicle to travel, and a tedding device connected to the traveling vehicle and configured to ted the grass.

2. The grass management system according to claim 1, comprising a moisture map creating circuit to create a moisture map of an agricultural field based on the first moisture value and the mowing position,
   wherein the creation supporting circuit is configured to display the moisture map that is created by the moisture map creating circuit in creating the operation plan.

3. The grass management system according to claim 1,
   wherein the creation supporting circuit is configured to determine time of the operation in the operation plan based on the first moisture value.

4. The grass management system according to claim 1,
   wherein the creation supporting circuit is configured to determine date of the operation in the operation plan based on the first moisture value.

5. The grass management system according to claim 1, wherein
   the creation supporting circuit is configured to determine number of times of repeating the operation in the operation plan based on the first moisture value.

6. The grass management system according to claim 1, comprising
   a moisture map creating circuit to create a moisture map of an agricultural field based on the first moisture value and the mowing position,
   wherein the creation supporting circuit is configured to determine time of the operation in the operation plan based on the moisture map.

7. The grass management system according to claim 1, comprising
   a moisture map creating circuit to create a moisture map of an agricultural field based on the first moisture value and the mowing position,
   wherein the creation supporting circuit is configured to determine date of the operation in the operation plan based on the moisture map.

8. The grass management system according to claim 1, comprising
   a moisture map creating circuit to create a moisture map of an agricultural field based on the first moisture value and the mowing position,
   wherein the creation supporting circuit is configured to determine number of times of repeating the operation in the operation plan based on the moisture map.

9. The grass management system according to claim 1, comprising a moisture map creating circuit to create a moisture map of an agricultural field based on the first moisture value and the mowing position,
   wherein the creation supporting circuit is configured to determine a traveling route in the operation plan based on the moisture map.

10. The grass management system according to claim 1, comprising a weather obtaining circuit to obtain weather information of the agricultural field,
    wherein the creation supporting circuit is configured to support creation of the operation plan based on the weather information obtained by the weather obtaining circuit.

11. The grass management system according to claim 1, comprising a grass information obtaining circuit to obtain information relating to the grass,
    wherein the creation supporting circuit is configured to support creation of the operation plan based on the grass information obtained by the grass information obtaining circuit.

12. The grass management system according to claim 1, comprising a machine information obtaining circuit to obtain information at least relating to the working machine,
    wherein the creation supporting circuit is configured to support creation of the operation plan based on the information obtained by the machine information obtaining circuit.

13. The grass management system according to claim 1, comprising an agricultural field information obtaining circuit to obtain information at least relating to a shape of the agricultural field,
    wherein the creation supporting circuit is configured to support creation of the operation plan based on the information obtained by the agricultural field information obtaining circuit, the information at least relating to the shape of the agricultural field.

14. The grass management system according to claim 1, wherein the working machine includes a tedding machine to ted the grass already mowed, the tedding machine comprising a second moisture obtaining device to obtain a second moisture value of the grass in a tedding operation of the grass,
    and wherein the creation supporting circuit is configured to determine, based on the second moisture value, an operation plan to be carried out afterward.

15. The grass management system according to claim 1, wherein the mower includes:
    a traveling vehicle to travel; and
    a mowing device detachably connected to the traveling vehicle and configured to cut the grass.

16. The grass management system according to claim 1, wherein the mower includes:
    a storage device to store the first moisture value detected by the first moisture-obtaining device and the mowing position detected by the position-detecting device; and
    an outputting device to be connected to an external device and to output the first moisture value and the mowing position when connected to the external device, the first moisture value and the mowing position stored in the storage device.

17. A grass management system comprising:
    a first moisture-obtaining device to obtain a first moisture value of a grass in a mowing operation performed by a mower;
    a position-detecting device to detect a mowing position of the mower; and
    a creation supporting circuit to support creation of an operation plan for a working machine based on the first moisture value and the mowing position, the working machine being configured to perform an operation relating to the grass already mowed,
    wherein the working machine includes a rake having a traveling vehicle to travel, and a raking device connected to the traveling vehicle and configured to rake the grass.

18. The grass management system according to claim 17, comprising a moisture map creating circuit to create a moisture map of an agricultural field based on the first moisture value and the mowing position,
    wherein the creation supporting circuit is configured to determine one selected from a group consisting of time of the operation, date of the operation, number of times of repeating the operation, and a traveling route in the operation in the operation plan based on the first moisture value.

19. A grass management system comprising:
    a first moisture-obtaining device to obtain a first moisture value of a grass in a mowing operation performed by a mower;
    a position-detecting device to detect a mowing position of the mower; and
    a creation supporting circuit to support creation of an operation plan for a working machine based on the first moisture value and the mowing position, the working machine being configured to perform an operation relating to the grass already mowed,
    wherein the working machine includes a roll baler having a traveling vehicle to travel, and a baling device connected to the traveling vehicle and configured to bale the grass.

20. The grass management system according to claim 19, comprising a moisture map creating circuit to create a moisture map of an agricultural field based on the first moisture value and the mowing position,
    wherein the creation supporting circuit is configured to determine one selected from a group consisting of time of the operation, date of the operation, number of times of repeating the operation, and a traveling route in the operation in the operation plan based on the first moisture value.

* * * * *